US012720121B2

(12) United States Patent
Mahajan et al.

(10) Patent No.: US 12,720,121 B2
(45) **Date of Patent: *Aug. 25, 2026**

(54) SYSTEMS AND METHODS FOR VIDEO DECODING WITH PARTIAL-BLOCK DEBLOCKING FILTERING FOR USE BY CONSTRAINED DIRECTIONAL ENHANCEMENT FILTER

(71) Applicant: QUALCOMM Incorporated, San Diego, CA (US)

(72) Inventors: Vikrant Mahajan, Dinanagar (IN); Sandeep Nellikatte Srivatsa, Bangalore (IN); Ashish Mishra, Bhubaneswar (IN); Lingfeng Li, San Jose, CA (US); Apoorva Nagarajan, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/883,639

(22) Filed: Sep. 12, 2024

(65) Prior Publication Data

US 2025/0071344 A1 Feb. 27, 2025

Related U.S. Application Data

(63) Continuation of application No. 17/875,317, filed on Jul. 27, 2022, now Pat. No. 12,120,356.

(51) Int. Cl.
*H04N 19/86* (2014.01)
*H04N 19/176* (2014.01)

(52) U.S. Cl.
CPC .......... *H04N 19/86* (2014.11); *H04N 19/176* (2014.11)

(58) Field of Classification Search
CPC ...... H04N 19/176; H04N 19/82; H04N 19/86; H04N 19/117; H04N 19/159;
(Continued)

(56) References Cited

U.S. PATENT DOCUMENTS

| | | | | |
|---|---|---|---|---|
| 8,913,656 | B2 | 12/2014 | Hsu et al. | |
| 11,223,832 | B2 * | 1/2022 | Pu | H04N 19/94 |

(Continued)

FOREIGN PATENT DOCUMENTS

| | | | |
|---|---|---|---|
| CN | 115883852 | A | 3/2023 |

OTHER PUBLICATIONS

Correa M., et al., "AV1 and VVC Video Codecs: Overview on Complexity Reduction and Hardware Design", IEEE Open Journal of Circuits and Systems, IEEE, vol. 2, Sep. 13, 2021, pp. 564-576, XP011878048, Section II.F.

(Continued)

*Primary Examiner* — Alison Slater
(74) *Attorney, Agent, or Firm* — Polsinelli LLP

(57) ABSTRACT

Video decoding systems and techniques are described. The decoder applies a deblocking (DB) filter to the plurality of sub-blocks of a block of video data to generate a DB-filtered plurality of sub-blocks. The decoder applies the DB filter to one or more lines (e.g., columns) of pixels in an additional sub-block of the block to generate a DB-filtered portion of the additional sub-block. The one or more lines of pixels in the additional sub-block are filtered without filtering an entirety of the additional sub-block using the DB filter. The additional sub-block is adjacent to at least one of the plurality of sub-blocks. The decoder applies a constrained directional enhancement filter (CDEF) to the DB-filtered plurality of sub-blocks and the DB-filtered portion of the additional sub-block to generate a CDEF-filtered plurality of sub-blocks.

30 Claims, 7 Drawing Sheets

(58) Field of Classification Search
CPC .... H04N 19/423; H04N 19/17; H04N 19/172; H04N 19/174; H04N 19/80
See application file for complete search history.

(56) References Cited

U.S. PATENT DOCUMENTS

| | | | | |
|---|---|---|---|---|
| 11,765,365 | B2 * | 9/2023 | Tsai | H04N 19/167 375/240.16 |
| 11,917,144 | B2 * | 2/2024 | Wu | H04N 19/82 |
| 12,120,356 | B2 | 10/2024 | Mahajan et al. | |
| 2016/0050442 | A1 * | 2/2016 | Saxena | H04N 19/865 375/240.29 |
| 2016/0286232 | A1 * | 9/2016 | Li | H04N 19/96 |
| 2023/0412800 | A1 | 12/2023 | Wu et al. | |
| 2024/0040159 | A1 | 2/2024 | Mahajan et al. | |

OTHER PUBLICATIONS

International Search Report and Written Opinion—PCT/US2023/067499—ISA/EPO—Aug. 28, 2023.

Midtskogen S., et al., “The AV1 Constrained Directional Enhancement Filter (CDEF) ”, IEEE International Conference on Acoustics, Speech and Signal Processing (ICASSP), IEEE, Apr. 15, 2018, XP033401342, pp. 1193-1197.

Zhao X., et al., “TM-AVC1273—Tool Description for AV1 and Libaom”, Digital Video Broadcasting (DVB), C/O EBU—17A Ancienne Route—CH-1218 Grand Saconnex, Geneva—Switzerland, No. 1, Nov. 4, 2021, XP017892634, 41 Pages, sections 3.7.1, 3.7.2, 3.7.3 and 3.7.4.

Zummach E., et al., “An UHD 4K@60fps Deblocking Filter Hardware Targeting the AV1 Decoder”, 27th IEEE International Conference on Electronics, Circuits and Systems (ICECS), Nov. 23, 2020, 4 pages, XP093074654, section II.

* cited by examiner

Video Source 102

Encoding Engine 106

Storage 108

Output 110

Encoding Device 104

120

Video Destination Device 122

Storage 118

Decoder Engine 116

Input 114

Decoding Device 112

Block_Width

Reconstructed Block Pixels 405

DB Filter 210

Vert. DB Filter 230

Horiz. DB Filter 235

Block_Width – 8

8

Fully DB-Filtered Pixels 410

Partly DB-Filtered Pixels 415

CDEF Filter 215

Block_Width – 16

8

8

Fully CDEF-Filtered Pixels 420

DB-Filtered Pixels 425 (not CDEF-filtered)

Partly DB-Filtered Pixels 415

2

8

8

DB-Filtered Pixels 425 (not CDEF-filtered)

Partly DB-Filtered Pixels 415

Nbr. Blk. Line Buffer 205

DB-Filtered Pixels 430 (stored as neighbors for CDEF filtering)

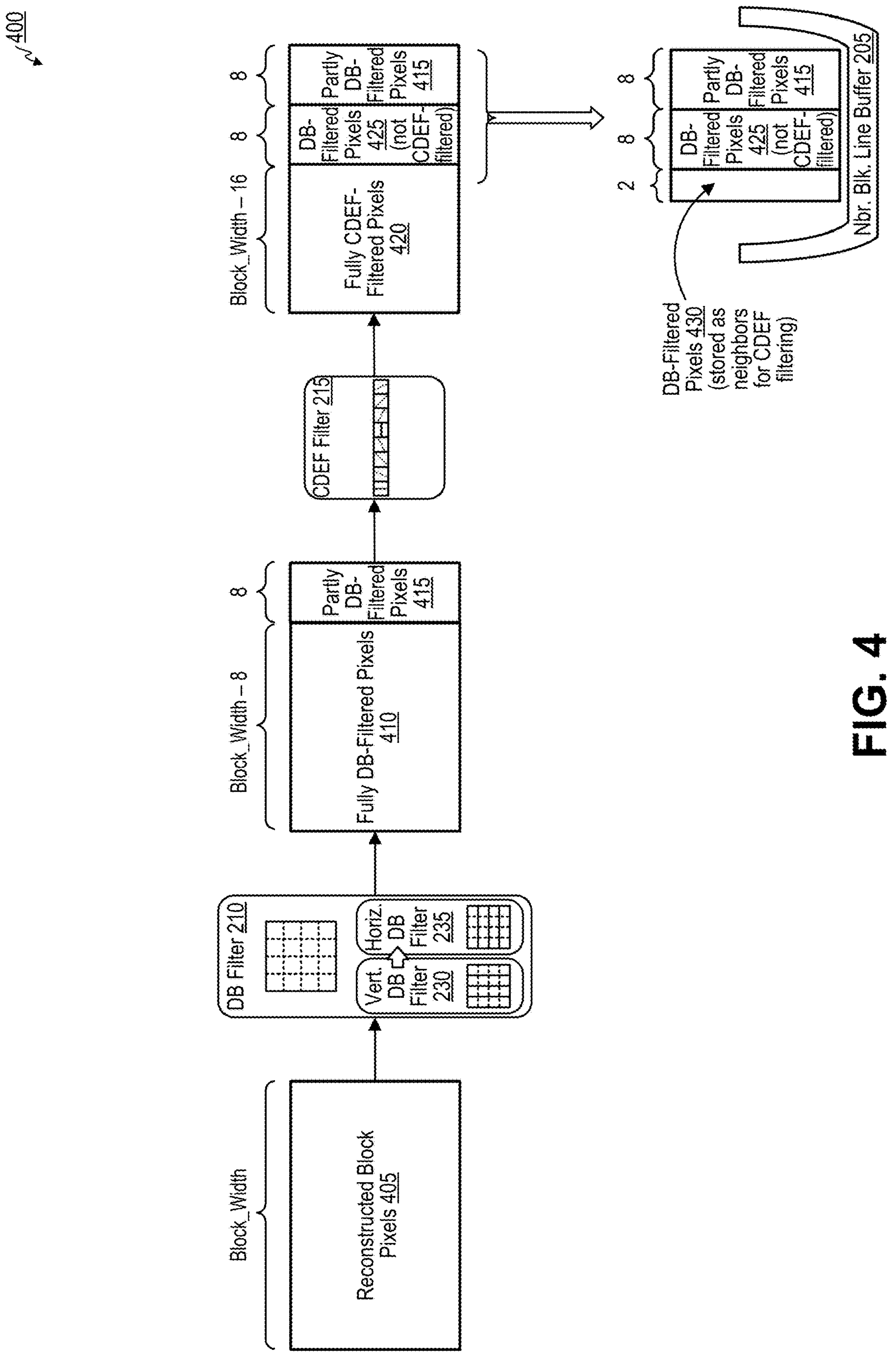

FIG. 4

Apply A Deblocking (DB) Filter To A Plurality Of Sub-Blocks Of A Block Of The Video Data To Generate A DB-Filtered Plurality Of Sub-Blocks, The Plurality Of Sub-Blocks Being Less Than An Entirety Of Sub-Blocks Within The Block
605

Apply The DB Filter To One Or More Lines Of Pixels In An Additional Sub-Block Of The Block To Generate A DB-Filtered Portion Of The Additional Sub-Block, Wherein The One Or More Lines Of Pixels In The Additional Sub-Block Are Filtered Without Filtering An Entirety Of The Additional Sub-Block Using The DB Filter, And Wherein The Additional Sub-Block Is Adjacent To At Least One Of The Plurality Of Sub-Blocks
610

Apply A Constrained Directional Enhancement Filter (CDEF) To The DB-Filtered Plurality Of Sub-Blocks And The DB-Filtered Portion Of The Additional Sub-Block To Generate A CDEF-Filtered Plurality Of Sub-Blocks
625

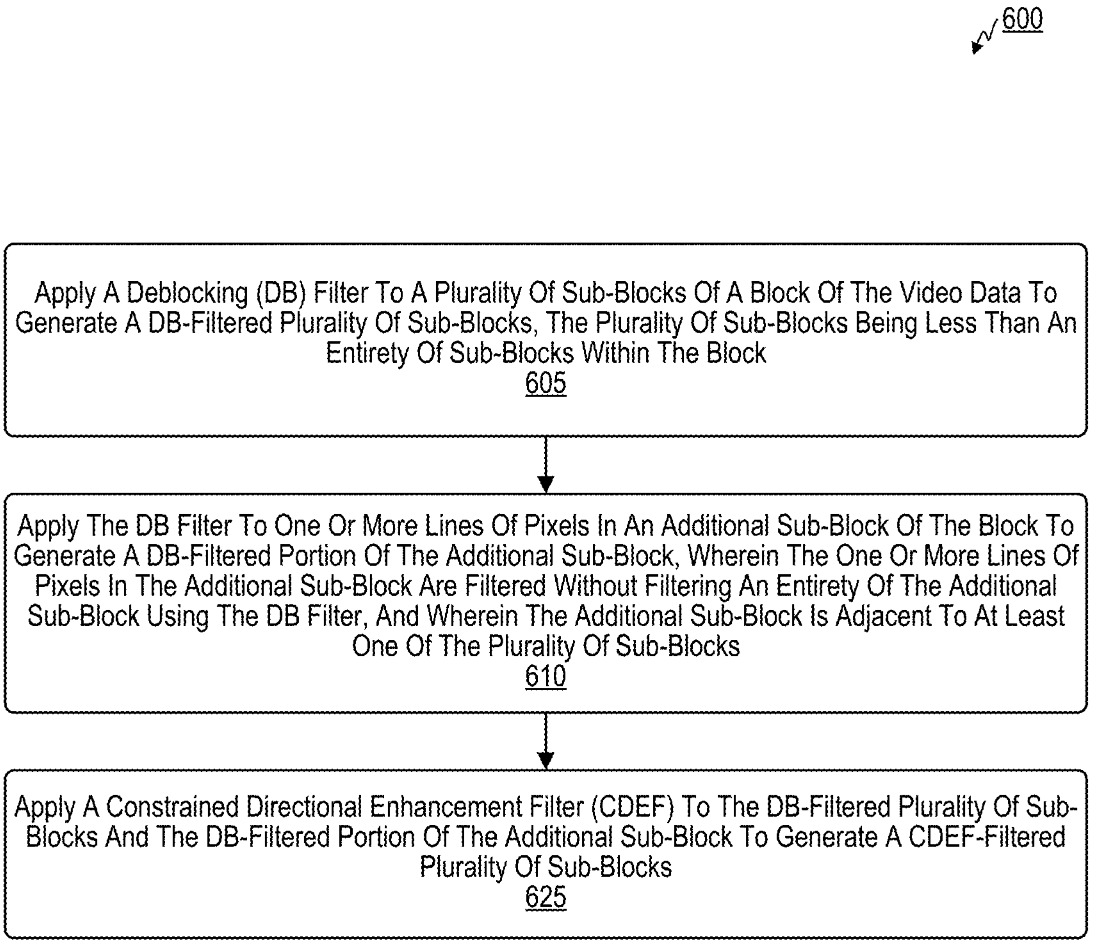

FIG. 6

SYSTEMS AND METHODS FOR VIDEO DECODING WITH PARTIAL-BLOCK DEBLOCKING FILTERING FOR USE BY CONSTRAINED DIRECTIONAL ENHANCEMENT FILTER

CROSS-REFERENCE TO RELATED APPLICATIONS

This application is a continuation of U.S. patent application Ser. No. 17/875,317, filed Jul. 27, 2022, which is hereby incorporated by referenced in it's entirety and for all purposes.

FIELD

This application is related to video decoding, decompression, and filtering. More specifically, this application relates to systems and methods of performing improved video decoding of a block of video data, including by fully applying a deblocking (DB) filter to a portion of a sub-block of the block, which allows a constrained directional enhancement filter (CDEF) to be applied to an increased amount of the block, ultimately reducing an amount of data to be stored in a neighboring block buffer.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, cellular or satellite radio telephones, mobile phones (e.g., so-called "smart phones"), video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. The large amount of video data needed to meet these demands places a burden on communication networks and devices that process and store the video data.

Digital video devices can implement video coding techniques to compress video data. Video coding can be performed according to one or more video coding standards or formats. For example, video coding standards or formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. A goal of video decoding techniques is to recreate the original video data as closely as possible from the compressed video data. With ever-evolving video services becoming available, coding and decoding techniques with improved coding and decoding efficiencies are needed.

BRIEF SUMMARY

In some examples, systems and techniques are described for video decoding. In some examples, a decoder system reads video data from a block of a video frame. The block includes a plurality of sub-blocks. In some examples, the sub-blocks have dimensions of 4 pixels by 4 pixels. The decoder system applies a deblocking (DB) filter to the plurality of sub-blocks of the block to generate a DB-filtered plurality of sub-blocks. The decoder system applies the DB filter to one or more lines of pixels in an additional sub-block of the block to generate a DB-filtered portion of the additional sub-block. The one or more lines of pixels in the additional sub-block are filtered without filtering an entirety of the additional sub-block using the DB filter. In some examples, the one or more lines of pixels in the additional sub-block include two columns of pixels in the additional sub-block that are adjacent to one another and that are respectively 6 and 7 pixels away from a right edge of the block. The additional sub-block is adjacent to at least one of the plurality of sub-blocks. The decoder system applies a constrained directional enhancement filter (CDEF) to the DB-filtered plurality of sub-blocks and the DB-filtered portion of the additional sub-block to generate a CDEF-filtered plurality of sub-blocks. In some examples, the decoder system upscales the CDEF-filtered plurality of sub-blocks to generate an upscaled-CDEF-filtered plurality of sub-blocks. In some examples, the decoder system applies a loop restoration (LR) filter to the upscaled-CDEF-filtered plurality of sub-blocks to generate output block data. In some examples, the decoder system outputs the output block data, for instance by storing the output block data in memory, displaying the output block data as part of a decoded video using a display, transmitting the output block data (e.g., as part of a video file or video stream) to at least one recipient device, or a combination thereof. In some examples, the decoder system stores a partially-DB-filtered portion of the block in a neighboring block buffer, and the decoder system can apply at least one filter (e.g., the DB filter, the CDEF, the upscaler, and/or the LR filter) to the partially-DB-filtered portion of the block from the neighboring block buffer and to a second block that neighbors the block to filter the second block.

In one example, an apparatus for media processing is provided. The apparatus includes a memory and one or more processors (e.g., implemented in circuitry) coupled to the memory. The one or more processors are configured to and can: apply a deblocking (DB) filter to a plurality of sub-blocks of a block of the video data to generate a DB-filtered plurality of sub-blocks, the plurality of sub-blocks being less than an entirety of sub-blocks within the block; apply the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and apply a constrained directional enhancement filter (CDEF) to the DB-filtered plurality of sub-blocks and the DB-filtered portion of the additional sub-block to generate a CDEF-filtered plurality of sub-blocks.

In another example, a method of video decoding is provided. The method includes: applying a deblocking (DB)

filter to a plurality of sub-blocks of a block of video data to generate a DB-filtered plurality of sub-blocks, the plurality of sub-blocks being less than an entirety of sub-blocks within the block; applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and applying a constrained directional enhancement filter (CDEF) to the DB-filtered plurality of sub-blocks and the DB-filtered portion of the additional sub-block to generate a CDEF-filtered plurality of sub-blocks.

In another example, a non-transitory computer-readable medium is provided that has stored thereon instructions that, when executed by one or more processors, cause the one or more processors to: apply a deblocking (DB) filter to a plurality of sub-blocks of a block of the video data to generate a DB-filtered plurality of sub-blocks, the plurality of sub-blocks being less than an entirety of sub-blocks within the block; apply the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and apply a constrained directional enhancement filter (CDEF) to the DB-filtered plurality of sub-blocks and the DB-filtered portion of the additional sub-block to generate a CDEF-filtered plurality of sub-blocks.

In another example, an apparatus for video decoding is provided. The apparatus includes: means for applying a deblocking (DB) filter to a plurality of sub-blocks of a block of video data to generate a DB-filtered plurality of sub-blocks, the plurality of sub-blocks being less than an entirety of sub-blocks within the block; means for applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and means for applying a constrained directional enhancement filter (CDEF) to the DB-filtered plurality of sub-blocks and the DB-filtered portion of the additional sub-block to generate a CDEF-filtered plurality of sub-blocks.

In some aspects, the one or more lines of pixels in the block include at least two lines of pixels in the block that are adjacent to one another.

In some aspects, the one or more lines of pixels in the block include are each at least six pixels away from an edge of the block. In some aspects, the edge of the block is a vertical edge along a side of the block, and wherein the one or more lines of pixels include one or more columns of pixels that are each at least six pixels horizontally away from the vertical edge. In some aspects, the side of the block is a right side of the block, and wherein the one or more columns of pixels are each at least six pixels leftward of the vertical edge along the right side of the block.

In some aspects, the DB filter is applied to the plurality of sub-blocks and at least one of the one or more lines of pixels in the additional sub-block to filter the plurality of sub-blocks to generate the DB-filtered plurality of sub-blocks.

In some aspects, the additional sub-block and each of the plurality of sub-blocks have a size of 4 pixels by 4 pixels.

In some aspects, one or more of the methods, apparatuses, and computer-readable medium described above further comprise: storing a partially-DB-filtered portion of the block in a neighboring block buffer; and applying at least one filter to the partially-DB-filtered portion of the block from the neighboring block buffer and to a second block that neighbors the block to filter the second block. In some aspects, the partially-DB-filtered portion of the block includes the additional sub-block. In some aspects, the partially-DB-filtered portion of the block includes the DB-filtered portion of the additional sub-block. In some aspects, a height of the partially-DB-filtered portion of the block is a height of the block, and wherein a width of the partially-DB-filtered portion of the block is less than a width of four sub-blocks. In some aspects, a height of the partially-DB-filtered portion of the block is a height of the block, and wherein a width of the partially-DB-filtered portion of the block is at most 10 pixels.

In some aspects, one or more of the methods, apparatuses, and computer-readable medium described above further comprise: upscaling the CDEF-filtered plurality of sub-blocks to generate an upscaled-CDEF-filtered plurality of sub-blocks; and applying a loop restoration (LR) filter to the upscaled-CDEF-filtered plurality of sub-blocks to generate output block data. In some aspects, one or more of the methods, apparatuses, and computer-readable medium described above further comprise: outputting the output block data for storage in at least one memory. In some aspects, one or more of the methods, apparatuses, and computer-readable medium described above further comprise: causing the output block data to be displayed according to the video data using a display. In some aspects, one or more of the methods, apparatuses, and computer-readable medium described above further comprise: causing the output block data to be transmitted to a recipient device using a communication interface.

In some aspects, one or more of the methods, apparatuses, and computer-readable medium described above further comprise: encoding the video data using a video encoder; and receiving the video data from the video encoder before applying the DB filter to the plurality of sub-blocks of the block.

In some aspects, apparatuses and/or computer-readable medium described above include at least one of a head-mounted display (HMD), a mobile handset, or a wireless communication device.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 4 is a block diagram illustrating a decoder system that applies a deblocking (DB) filter and a constrained directional enhancement filter (CDEF) to a block of video data, in accordance with some examples;

FIG. 6 is a flow diagram illustrating a codec process, in accordance with some examples.

DETAILED DESCRIPTION

Figure 1:
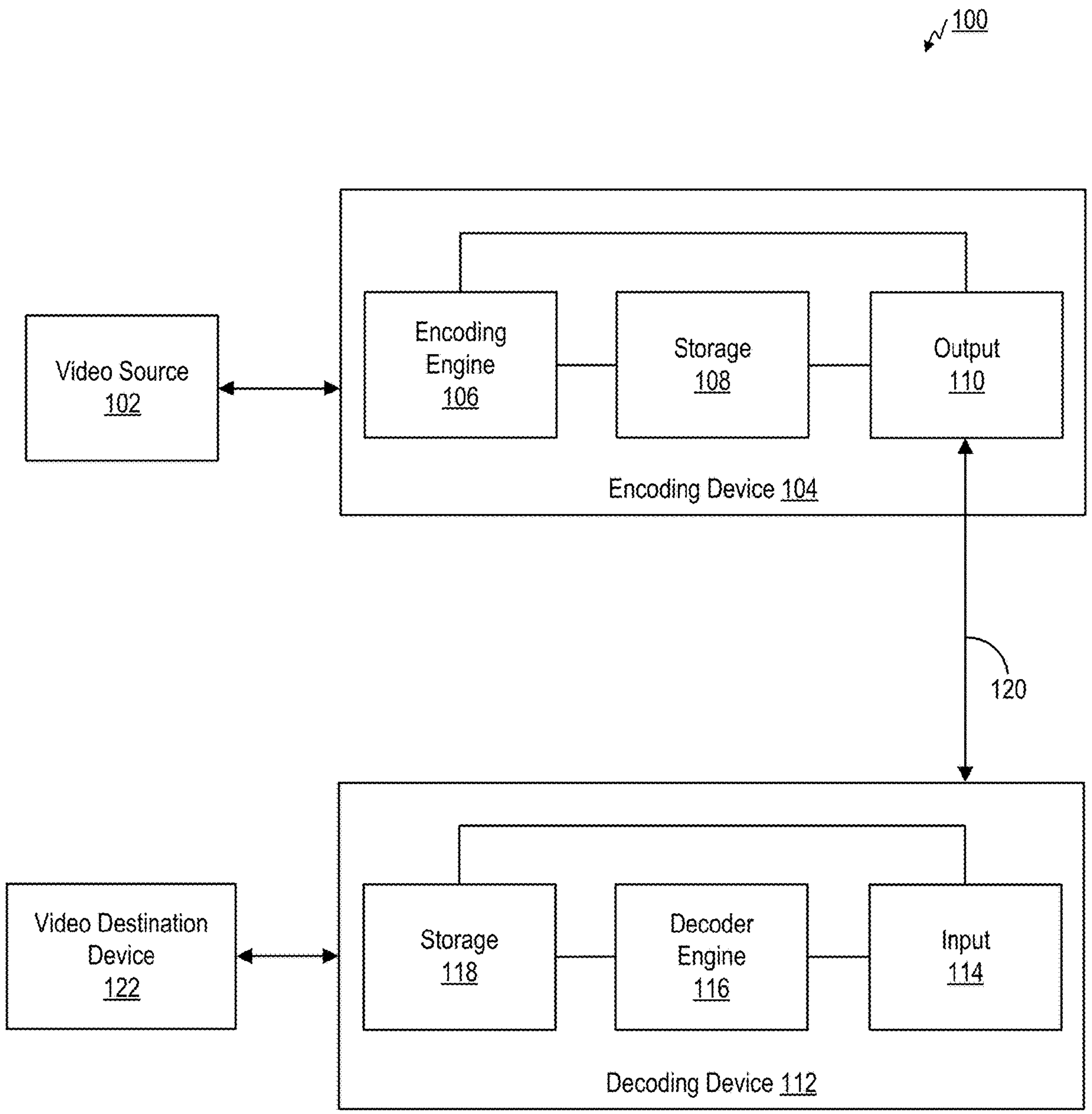
FIG. 1 is a block diagram illustrating an example of a system including an encoding device and a decoding device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

The AV1 video codec (alternatively or additionally referred to herein as the AV1 video coding format) specifies a decoder that decodes video data in part by processing the video data using a deblocking (DB) filter, a constrained directional enhancement filter (CDEF), an upscaler, and a loop restoration (LR) filter, in that order.

The AV1 video codec/format specifies that for DB filtering, the decoder first vertically filters the video data, and then horizontally filters the pixel data. In some examples, the vertical DB filtering algorithm uses 13-tap filtering for at least some vertical edges. Thus, to perform vertical DB filtering on a specified edge of a block (e.g., a largest coding block known as a superblock) or a constituent block resulting from partitioning of a larger block (e.g., sub-block of video data), the vertical DB filter algorithm uses both pixel data from 7 columns of pixels to the left of (leftward of) the specified edge and 7 columns of pixels to the right of the specified edge, and modifies pixel data in up to 6 columns of pixels to the left of (leftward of) the specified edge and 6 columns of pixels to the right of the specified edge. Thus, to perform vertical DB filtering on a column of pixel data that is at (or alternatively within a range of pixel columns or pixel rows) the left or right edge of a block (e.g., a superblock), the DB filter algorithm may need up to 7 columns of pixel data from a neighboring superblock. However, in some examples, the AV1 video codec/format uses a neighbor line buffer that stores pixel data from the left neighbor block to the left of the block being filtered. In such examples, there may be columns of pixels in sub-blocks along or near the right edge of a specified block that cannot undergo vertical DB filtering during a DB-filtering process for the specified block, due to lack of pixel data from a right neighboring block to the right of the specified block. The lack of vertical DB filtering for these portions of the specified block during the DB-filtering process for the specified block can prevent further filtering processes for the specified block (such as horizontal DB filtering, CDEF filtering, upscaling, LR filtering, and the like). As a result, these unfiltered or incompletely filtered portions of the specified block can be stored in the neighbor line buffer for decoding the next block in the video data.

In some examples, a block has a size of 64 pixels by 64 pixels, and is divided into sub-blocks of 4 pixels by 4 pixels. In some examples, a block size, or a sub-block size, may be 2 pixels by 2 pixels, 3 pixels by 3 pixels, 4 pixels by 4 pixels, 5 pixels by 5 pixels, 6 pixels by 6 pixels, 8 pixels by 8 pixels, 10 pixels by 10 pixels, 12 pixels by 12 pixels, 16 pixels by 16 pixels, 32 pixels by 32 pixels, 64 pixels by 64 pixels, 128 pixels by 128 pixels, 256 pixels by 256 pixels, 512 pixels by 512 pixels, or another size. Generally, DB filtering is performed for an entire sub-block at a time. In such examples, in a given row of sub-blocks, the two rightmost sub-blocks in the row cannot be fully DB-filtered, since the vertical DB filter uses pixel data from 7 pixels on the left and right sides of a given vertical edge.

In some examples, CDEF filtering filters an 8 pixel by 8 pixel area at a time in the luma space, and a 4 pixel by 4 pixel area at a time in the chroma space. In some examples, the CDEF filtering algorithm uses 5-tap filtering. Thus, to filter a specified area of pixels using CDEF filtering, the CDEF filtering algorithm uses both pixel data from 2 columns of pixels to the left of the specified area of pixels and 2 columns of pixels to the right of the specified area of pixels. In some examples, any data that the CDEF filtering algorithm uses for CDEF filtering needs to already be fully DB filtered (e.g., vertically DB filtered as well as horizontally DB filtered). Thus, in order to perform CDEF filtering on a pixel that is 9 pixels to the left of a right edge of the block, the pixel data in the pixels that are 8 and 7 pixels to the left of the right edge of the block would need to be DB filtered. However, under traditional decoding techniques, the pixel data in in the pixels that are 8 and 7 pixels to the left of the right edge of the block is not fully DB filtered. This pixel data can be can be missing horizontal DB filtering and/or vertical DB filtering. For instance, this pixel data can be vertically DB filtered without being horizontally DB filtered. This, in turn, prevents the third and fourth sub-blocks to the left of the right edge from being CDEF-filtered.

In examples where the vertical DB filtering algorithm uses 13-tap filtering for at least some edges, vertical DB filtering is possible for two columns of pixels that are 7 and 8 pixels to the left of the right edge of the block, respectively. These columns are in the second-closest sub-block to the right edge, in examples where the sub-blocks are 4 pixels by 4 pixels in size. For instance, the column of pixels that is 8 pixels to the left of the right edge of the block is neither used nor modified by vertical DB filtering of the right edge of the block, while the column of pixels that is 7 pixels to the left of the right edge of the block is used but not modified by the vertical DB filtering of the right edge of the block. The horizontal edges of this sub-block can be horizontally DB-filtered for those two columns, without being filtered for the rest of the sub-block. Thus, these two columns of pixels can be fully DB filtered. This allows areas of pixels in the third and fourth sub-blocks from the right edge of the block to be CDEF filtered, since the CDEF filter can be applied using these two columns of pixels following DB-filtering. CDEF filtering of these sub-blocks in turn allows for upscaling and LR-filtering of these sub-blocks, ultimately allowing more of the block to be fully filtered.

Once the decoder system moves on from decoding and/or filtering the specified block to decoding and/or filtering the next block to the right of the specified block, the decoder system can store less of the specified block in a neighboring block line buffer (e.g., left line buffer) for use in decoding and/or filtering the next block. For instance, the third and fourth sub-blocks from the right edge of the specified block might otherwise need to be added to the neighboring block line buffer, but no longer need to be based on use of the partial-sub-block DB filtering technique described above and otherwise herein, and the increased area of the specified block that becomes CDEF-filtered (and/or upscaled and/or LR filtered) that the partial-sub-block DB filtering technique makes possible. In some examples, the systems and techniques described herein decrease how much data is to be stored in the neighboring block line buffer by 44%.

In some examples, the systems and methods described herein describe a decoder system. In some examples, the decoder system reads video data from a block of a video frame. The block includes a plurality of sub-blocks. In some examples, the sub-blocks have dimensions of 4 pixels by 4 pixels. The decoder system applies a deblocking (DB) filter to the plurality of sub-blocks of the block to generate a DB-filtered plurality of sub-blocks. The decoder system applies the DB filter to one or more lines of pixels in an additional sub-block of the block to generate a DB-filtered portion of the additional sub-block. The one or more lines of pixels in the additional sub-block are filtered without filtering an entirety of the additional sub-block using the DB filter. In some examples, the one or more lines of pixels in the additional sub-block include two columns of pixels in the additional sub-block that are adjacent to one another and that are respectively 6 and 7 pixels away from a right edge of the block. The additional sub-block is adjacent to at least one of the plurality of sub-blocks. The decoder system applies a constrained directional enhancement filter (CDEF) to the DB-filtered plurality of sub-blocks and the DB-filtered portion of the additional sub-block to generate a CDEF-filtered plurality of sub-blocks. In some examples, the decoder system upscales the CDEF-filtered plurality of sub-blocks to generate an upscaled-CDEF-filtered plurality of sub-blocks. In some examples, the decoder system applies a loop restoration (LR) filter to the upscaled-CDEF-filtered plurality of sub-blocks to generate output block data. In some examples, the decoder system outputs the output block data, for instance by storing the output block data in memory, displaying the output block data as part of a decoded video using a display, transmitting the output block data (e.g., as part of a video file or video stream) to at least one recipient device, or a combination thereof. In some examples, the decoder system stores a partially-DB-filtered portion of the block in a neighboring block buffer, and the decoder system can apply at least one filter (e.g., the DB filter, the CDEF, the upscaler, and/or the LR filter) to the partially-DB-filtered portion of the block from the neighboring block buffer and to a second block that neighbors the block to filter the second block.

The systems and methods described herein provide technical solutions to various technical problems with other decoder systems. For instance, during decoding of a specified block, some decoder systems are unable to filter certain sub-blocks of a specified block using certain filters (e.g., DB filter, CDEF filter, upscaler, and/or LR filter), and are therefore unable to fully decode those sub-blocks of the specified block, at least until such decoder systems move onto filtering the next block. As a result, such decoder systems end up needing to store these unfiltered sub-blocks in a neighboring block line buffer, increasing how much data such a neighboring block line buffer must be able to store, increasing an amount of write operations to the neighboring block line buffer, and increasing an amount of read operations to the neighboring block line buffer. This increases how much physical space the neighboring block line buffer requires in circuitry and increases power usage during decoding, both of which can be significant issues, especially for portable devices, always-on devices, low-powered devices, and the like. The systems and methods described herein allow for these sub-blocks of the specified block to be fully filtered and therefore fully decoded during decoding of the specified block, and remove any need to store these sub-blocks in the neighboring block line buffer. Thus, the systems and methods described herein reduce the amount of storage space needed in the neighboring block line buffer (e.g., by 44%), reduce the amount of writes to the neighboring block line buffer, reduce the amount of reads from the neighboring block line buffer, reduce the amount of power usage by the decoder system, or a combination thereof.

Various aspects of the application will be described with respect to the figures. FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video codecs, formats, and/or standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other codecs and/or coding formats, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Many embodiments described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

Two classes of Network Abstraction Layer (NAL) units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2...34 | INTRA_ANGULAR2...INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$,$refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2:
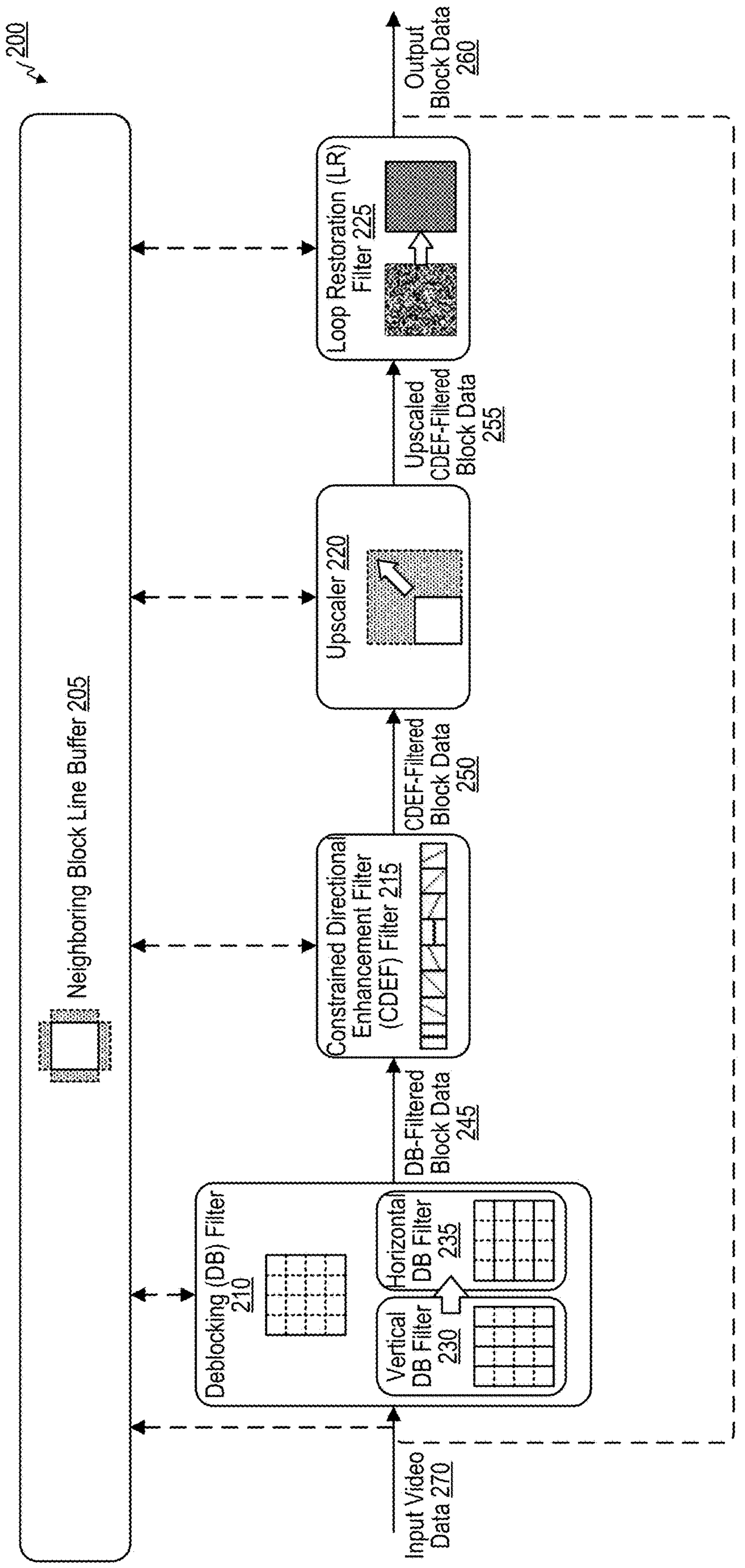
FIG. 2 is a block diagram illustrating a decoder system that includes a deblocking (DB) filter, constrained directional enhancement filter (CDEF), an upscaler, and a loop restoration (LR) filter, in accordance with some examples.

FIG. 2 is a block diagram illustrating a decoder system 200 that includes a deblocking (DB) filter 210, constrained directional enhancement filter (CDEF) 215, an upscaler 220, and a loop restoration (LR) filter 225. The decoder system 200 may be an example of the decoding device 112, the decoder engine 116, the decoder system 400, the decoder system 500, the codec system that performs the codec process 600, the computing system 700, or a combination thereof.

The decoder system 200 receives input video data 270. The input video data 270 may be encoded using an encoder, such as the encoding device 104 and/or the encoding engine 106. The encoded video data 270 may include, for example, the encoded video bitstream data (e.g., the NAL units) discussed with respect to the output 110 of the encoding device 104 and/or the input 114 of the decoding device 112. The decoder system 200 inputs the input video data 270 into a de-blocking (DB) filter 210. In some examples, the input video data 270 may be at least partially decoded and/or processed by the decoder system 200 (and/or another aspect of the decoding device 112 and/or the decoder engine 116) by the time the decoder system 200 inputs the input video data 270 into the DB filter 210. For instance, the decoder system 200 (and/or another aspect of the decoding device 112 and/or the decoder engine 116) can have already been processed using an inverse discrete cosine transform (IDCT). The input video data 270 includes pixel data from a first block of a video frame, as well as pixel data from a neighboring block of the video frame. The neighboring block can be located adjacent to the first block within the context of the video frame. In some examples, the neighboring block is located to the left of the first block within the context of the video frame. In some examples, the neighboring block is located above the first block within the context of the video frame. In some examples, the neighboring block is located to the right of the first block within the context of the video frame. In some examples, the neighboring block is located below the first block within the context of the video frame. In some examples, the first block and/or the neighboring block can be superblocks, macroblocks, and/or tiles.

The decoder system 200 uses the DB filter 210 to filter the input video data 270 to remove bordering artifacts at the edges of coded blocks (e.g., boundary discontinuities), for example by smoothing block edge artifacts away. In some examples, to filter the input video data 270 using the DB filter 210, the decoder system 200 can analyze the input video data 270 using one or more heuristic-based analysis to determine differences between bordering artifacts and legitimate details in video data at block edges, and control conditional application of smoothing at block edges. In some examples, the heuristic-based analysis can consider changes in luminosity at and/or across block edges, changes in specific color channels (e.g., red, green, and/or blue) at and/or across block edges, whether the block edges are internal to a larger block (e.g., superblock, macroblock, and/or tile) or at one or more edges of the larger block, any coded residuals present for the block, any block motion data (e.g., motion vectors) associated with the block, any block motion compensation data associated with the block, or a combination thereof. A graphic representing the DB filter 210 in FIG. 2 illustrates block edges using dotted lines, to represent smoothing of visual artifacts at such block edges to make the block edges less prominent when the video frame is viewed as a whole.

By filtering the input video data 270, the DB filter 210 generates DB-filtered block data 245 corresponding to the first block, and in some examples DB-filtered neighboring block data corresponding to the neighboring block. The decoder system 200 passes the DB-filtered block data 245 from the DB filter 210 to a constrained directional enhancement filter (CDEF) 215. In some examples, the decoder system 200 passes a portion of the DB-filtered block data 245 that corresponds to the neighboring block from the DB filter 210 to the neighboring block line buffer 205. In some examples, the decoder system 200 upscales at least the portion of the DB-filtered block data 245 that corresponds to the neighboring block before storing the portion of the DB-filtered block data 245 that corresponds to the neighboring block in the neighboring block line buffer 205.

In some examples, the DB filter 210 includes a vertical DB filter 230 and a horizontal DB filter 235. To apply the DB filter 210 to the input video data 270, the decoder system 200 can apply the vertical DB filter 230 to the input video data 270, then apply the horizontal DB filter 235 to the input video data 270 after the vertical DB filter 230 has already been applied, or vice versa. In some examples, the DB filter 210 (e.g., the vertical DB filter 230 and/or the horizontal DB filter 235) uses 13-tap filtering for at least some vertical edges. Under 13-tap filtering, to perform vertical DB filtering on a specified edge of a block (e.g., a superblock) or sub-block of video data, the DB filter 210 can uses both pixel data from 7 lines of pixels on a first side of the specified edge and 7 lines of pixels to a second side of the specified edge, and modifies pixel data in up to 6 columns of pixels to the first side of the specified edge and 6 columns of pixels to the second side of the specified edge. For instance, in some examples, the DB filter 210 (e.g., the vertical DB filter 230 and/or the horizontal DB filter 235) filters based on the following equations:

$$P5' = (P6*7 + P5*2 + P4*2 + P3 + P2 + P1 + P0 + Q0 + 8) \gg 4$$

$$P4' = (P6*5 + P5*2 + P4*2 + P3*2 + P2 + P1 + P0 + Q0 + Q1 + 8) \gg 4$$

$$P3' = (P6*4 + P5 + P4*2 + P3*2 + P2*2 + P1 + P0 + Q0 + Q1 + Q2 + 8) \gg 4$$

$$P2' = (P6*3 + P5 + P4 + P3*2 + P2*2 + P1*2 + P0 + Q0 + Q1 + Q2 + Q3 + 8) \gg 4$$

$$P1' = (P6*2 + P5 + P4 + P3 + P2 + P1*2 + P0 + Q0 + Q1 + Q2 + Q3 + Q4 + 8) \gg 4$$

$$P0' = (P6 + P5 + P4 + P3 + P2 + P1 + P0*2 + Q0*2 + Q1 + Q2 + Q3 + Q4 + Q5 + 8) \gg 4$$

$$Q0' = (P5 + P4 + P3 + P2 + P1 + P0*2 + Q0*2 + Q1*2 + Q2 + Q3 + Q4 + Q5 + Q6 + 8) \gg 4$$

$$Q1' = (P4 + P3 + P2 + P1 + P0 + Q0*2 + Q1*2 + Q2*2 + Q3 + Q4 + Q5 + Q6*2 + 8) \gg 4$$

$$Q2' = (P3 + P2 + P1 + P0 + Q0 + Q1*2 + Q2*2 + Q3*2 + Q4 + Q5 + Q6*3 + 8) \gg 4$$

-continued $$Q3' = (P2 + P1 + P0 + Q0 + Q1 + Q2*2 + Q3*2 + Q4*2 + Q5 + Q6*4 + 8) \gg 4$$

$$Q4' = (P1 + P0 + Q0 + Q1 + Q2 + Q3*2 + Q4*2 + Q5*2 + Q6*5 + 8) \gg 4$$

$$Q5' = (P0 + Q0 + Q1 + Q2 + Q3 + Q4*2 + Q5*2 + Q6*7 + 8) \gg 4$$

In the equations above, P0 through P6 represent pixels on the first side of the specified edge in the input video data 270, while Q0 through 6 represent pixels on the second side of the specified edge in the input video data 270. In the equations above, P0' through P6' represent pixels on the first side of the specified edge in the DB-filtered block data 245, while Q0' through Q6' represent pixels on the second side of the specified edge in the DB-filtered block data 245. For vertical DB filtering (e.g., using the vertical DB filter 230), the specified edge may be a vertical edge, the first side of the specified edge may be the left side of the specified edge, and the second side of the specified edge may be the right side of the specified edge. For horizontal DB filtering (e.g., using the horizontal DB filter 235), the specified edge may be a horizontal edge, the first side of the specified edge may be the top side of the specified edge, and the second side of the specified edge may be the bottom side of the specified edge.

The decoder system 200 can filter the DB-filtered block data 245 using the CDEF filter 215 to generate CDEF-filtered block data 250. To filter the DB-filtered block data 245 using the CDEF filter 215, the decoder system 200 can also retrieve the DB-filtered neighboring block data from the neighboring block line buffer 205, and use the DB-filtered neighboring block data as well as the DB-filtered block data 245 as inputs to the CDEF filter 215 to generate the CDEF-filtered block data 250. The CDEF filter 215 can remove ringing and basis noise around sharp edges in the DB-filtered block data 245. In some examples, the CDEF filter 215 can be a direction filter that follow edges based on direction of the edges, for instance performing a direction search using the DB-filtered block data 245. In some examples, CDEF filter 215 can operate in 8 different directions (e.g., from 0 to 7). A graphic representing the CDEF filter 215 in FIG. 2 illustrates example block edges oriented according to each of the 8 different directions.

In In some examples, the CDEF filter 215 calculates a mean square error (MSE) for each pixel in the DB-filtered block data 245 by subtracting 128 from the pixel value and squaring the difference. For each line (k) present in a particular direction (d), the CDEF filter 215 can add the MSE for all of the pixels, multiply the sum by 840, and divide by a number of pixels present in the line ($N_{d,k}$). For instance, 840 may represent a least common multiple of $N_{d,k}$. In this way, the CDEF filter 215 can normalize MSE for each line, as the number of pixels can be different for each line. The CDEF filter 215 can calculate direction strength for each direction ($s_d$) by adding the MSE for all lines present in that direction. For instance, these calculations may be represented as such:

$$s_d = \sum_k \frac{840}{N_{d,k}} \left( \sum_{p \in P_{d,k}} (x - 128) \right)^2;$$

In In some examples, the CDEF filter 215 can select the strongest direction strength ($s_d$) as a selected direction $d_{opt}$, for instance as follows:

$$d_{opt}: s_{opt} = \max_d s_d$$

In some examples, the CDEF filter 215 uses 5-tap filtering. Thus, to perform CDEF filtering on a specified area of the DB-filtered block data 245, the CDEF filter 215 uses both pixel data from 2 lines of pixels to a first side of the specified area of pixels and 2 lines of pixels to a second side of the specified area of pixels. In some examples, the first side of the specified area may be the left side of the specified area, and the second side of the specified area may be the right side of the specified area. In some examples, the first side of the specified area may be the top side of the specified area, and the second side of the specified area may be the bottom side of the specified area. In some examples, the CDEF filter 215 uses both pixels from all sides of the specified area (e.g., top, right, bottom, and left) to CDEF-filter the DB-filtered block data 245. For instance, in some examples, the CDEF filter 215 filters based on the following equation:

$$y(i, j) = x(i, j) + \sum_{m=-2 \text{ to } 2} \sum_{n=-2 \text{ to } 2} x(i+m, j+n) * (\text{pri\_dir}(i, j) + \text{sec\_dir}(i, j))$$

In the equations above, m and n can represent the lines of pixel data around the specified area being filtered using the CDEF filter 215.

In some examples, the CDEF filter 215 performs a direction search using the DB-filtered block data 245.

The decoder system 200 passes the CDEF-filtered block data 250 generated using the CDEF filter 215 to the upscaler 220 to generate upscaled CDEF-filtered block data 255 using the upscaler 220. The upscaler 220 upscales the CDEF-filtered block data 250 by an upscaling factor to generate the upscaled CDEF-filtered block data 255. In an illustrative example, the upscaling factor is 2. In some examples, the upscaling factor can be 1.125, 1.25, 1.5, 1.75, 2, 3, 4, 5, 6, 7, 8, 9, 10, a higher upscaling factor than 10, a lower upscaling factor than 1.125, an upscaling factor between any two previously-listed upscaling factors, or another appropriate upscaling factor. A graphic representing the upscaler 220 in FIG. 2 illustrates upscaling of a block by a factor of 2. The upscaler 220 can use any upscaling technique(s), such as upscaling, upsampling, resampling, resizing, nearest-neighbor interpolation, bilinear interpolation, bicubic interpolation, sine resampling, Lanczos resampling, box sampling, mipmapping, interpolation based on Fourier transform(s), edge-directed interpolation, high-quality scaling (HQX), vectorization, super-resolution, deep convolutional neural network(s), or a combination thereof.

In some examples, the upscaler 220 performs horizontal upscaling without vertical upscaling. In some examples, the upscaler 220 performs vertical upscaling without horizontal upscaling. In some examples, the upscaler 220 performs both horizontal upscaling and vertical upscaling.

The decoder system 200 passes the upscaled CDEF-filtered block data 255 to a loop restoration (LR) filter 225. In some examples, the decoder system 200 also retrieves neighboring block data (e.g., which may be DB-filtered, CDEF-filtered, and/or upscaled) from the neighboring block line buffer 205, and passes the neighboring block data to the LR filter 225. The decoder system 200 uses the LR filter 225 to filter the upscaled CDEF-filtered block data 255 to generate the output block data 260. In some examples, to filter the upscaled CDEF-filtered block data 255 using the LR filter 225, the decoder system 200 can also use the neighboring block data as well as the CDEF-filtered block data 255 as inputs to the LR filter 225 to generate the output block data 260. The LR filter 225 can include one or more configurable filters and/or switchable filters, such as one or more Wiener filters and/or one or more self-guided filters. In some examples, the LR filter 225, and/or the filter(s) that the LR filter 225 includes, include one or more convolving filters that are configured to build a kernel to restore lost quality of the input data (e.g., the upscaled CDEF-filtered block data 255). In some examples, the LR filter 225 is used for denoising and/or edge enhancement, for instance to remove DCT basis noise using configurable amount(s) of blurring. A graphic representing the LR filter 225 in FIG. 2 illustrates exemplary removal (e.g., smoothing) of noise.

In some examples, the LR filter 225 uses 7-tap filtering. Thus, to perform LR filtering on a specified area of the upscaled CDEF-filtered block data 255, the LR filter 225 uses both pixel data from 3 lines of pixels to a first side of the specified area of pixels and 3 lines of pixels to a second side of the specified area of pixels. In some examples, the first side of the specified area may be the left side of the specified area, and the second side of the specified area may be the right side of the specified area. In some examples, the first side of the specified area may be the top side of the specified area, and the second side of the specified area may be the bottom side of the specified area. In some examples, the LR filter 225 uses both pixels from all sides of the specified area (e.g., top, right, bottom, and left) to LR-filter the upscaled CDEF-filtered block data 255. For instance, in some examples, the LR filter 225 filters based on the following equation:

$$y'(i, j) = \sum_{m=-3\ to\ 3} \text{horz\_coeff} * x(i+m, j)$$

$$y(i, j) = \sum_{n=-3\ to\ 3} \text{vert\_coeff} * y'(i, j+n)$$

In the equations above, m and n can represent the lines of pixel data around the specified area being filtered using the LR filter 225.

In some examples, the decoder system 200 can pass the output of the LR filter 225 (e.g., the output block data 260) back to the DB filter 210 for another loop through the DB filter 210, the CDEF filter 215, the upscaler 220, the LR filter 225, and/or the neighboring block line buffer 205. In this way, the output block data 260 can be used as at least a portion of the input video data 270 (e.g., the portion representing the first block). This repetition of this filtering process can be referred to as a coding loop, and is represented in FIG. 2 by a dashed line arrow from the LR filter 225 back to the DB filter 210. In some examples, the output block data 260 may refer to the output of multiple repetitions of the filtering process in the coding loop. In some examples, the coding loop can also refer to filtering of different blocks in the video frame through the DB filter 210, the CDEF filter 215, the upscaler 220, the LR filter 225, and/or the neighboring block line buffer 205.

In some examples, the neighboring block line buffer 205 may store DB-filtered pixel data from a plurality of lines of a neighboring block that neighbors the first block. The neighboring block can be located adjacent to the first block within the context of the video frame. In some examples, the neighboring block is located to the left of the first block within the context of the video frame. In some examples, the neighboring block is located above the first block within the context of the video frame. In some examples, the neighboring block is located to the right of the first block within the context of the video frame. In some examples, the neighboring block is located below the first block within the context of the video frame. In some examples, the first block and/or the neighboring block can be superblocks, macroblocks, and/or tiles.

In some examples, in a decoder system 200 with 4:2:0 chroma sub-sampling where the neighboring block is located to the left of the first block in the video frame, the amount of data written to, stored in, and read from the neighboring block line buffer 205 from and/or for the DB filter 210 can be determined as follows:

$$DB \text{ Luma left } nbr \text{ buffer size} = 8 * \text{Luma\_Tile\_Height}$$

$$DB\ CB \text{ left } nbr \text{ buffer size} = 4 * \text{Luma\_Tile\_Height} * 1/2$$

$$DB\ CR \text{ left } nbr \text{ buffer size} = 4 * \text{Luma\_Tile\_Height} * 1/2$$

In some examples, in a decoder system 200 with 4:2:0 chroma sub-sampling where the neighboring block is located to the left of the first block in the video frame, the amount of data written to, stored in, and read from the neighboring block line buffer 205 from and/or for the CDEF filter 215 can be determined as follows:

$$CDEF \text{ Luma left } nbr \text{ buffer size} = 10 * \text{Luma\_Tile\_Height}$$

$$CDEF\ CB \text{ left buffer size} = 6 * \text{Luma\_Tile\_Height} * 1/2$$

$$CDEF\ CR \text{ left buffer size} = 6 * \text{Luma\_Tile\_Height} * 1/2$$

In some examples, in a decoder system 200 with 4:2:0 chroma sub-sampling where the neighboring block is located to the left of the first block in the video frame, the total amount of data written to, stored in, and read from the neighboring block line buffer 205 (e.g., from and/or for the DB filter 210 and/or the CDEF filter 215) can be determined as follows:

$$\text{Total } (DB + CDEF) \text{ left } nbr \text{ buffer size} = (28 * \text{Luma\_Tile\_Height})$$

In some examples, in a frame configured for the DB filter 210 and/or the CDEF filter 215, having two vertical tiles and no horizontal tile, the tile height may be equal to the frame height. For a frame height H, the total amount of data written to, stored in, and read from the neighboring block line buffer 205 (e.g., from and/or for the DB filter 210 and/or the CDEF filter 215) can be determined as follows:

$$\text{Total } (DB + CDEF) \text{ left } nbr \text{ buffer size} = 28 * H \text{ pixels}$$

In some examples, for frame rate (F frames per sec), minimum read/write memory bandwidth for writing data to and/or reading data from the neighboring block line buffer 205 is:

$$\text{Memory Bandwidth} = 28 * H * F \text{ pixels/sec}$$

Figure 3:
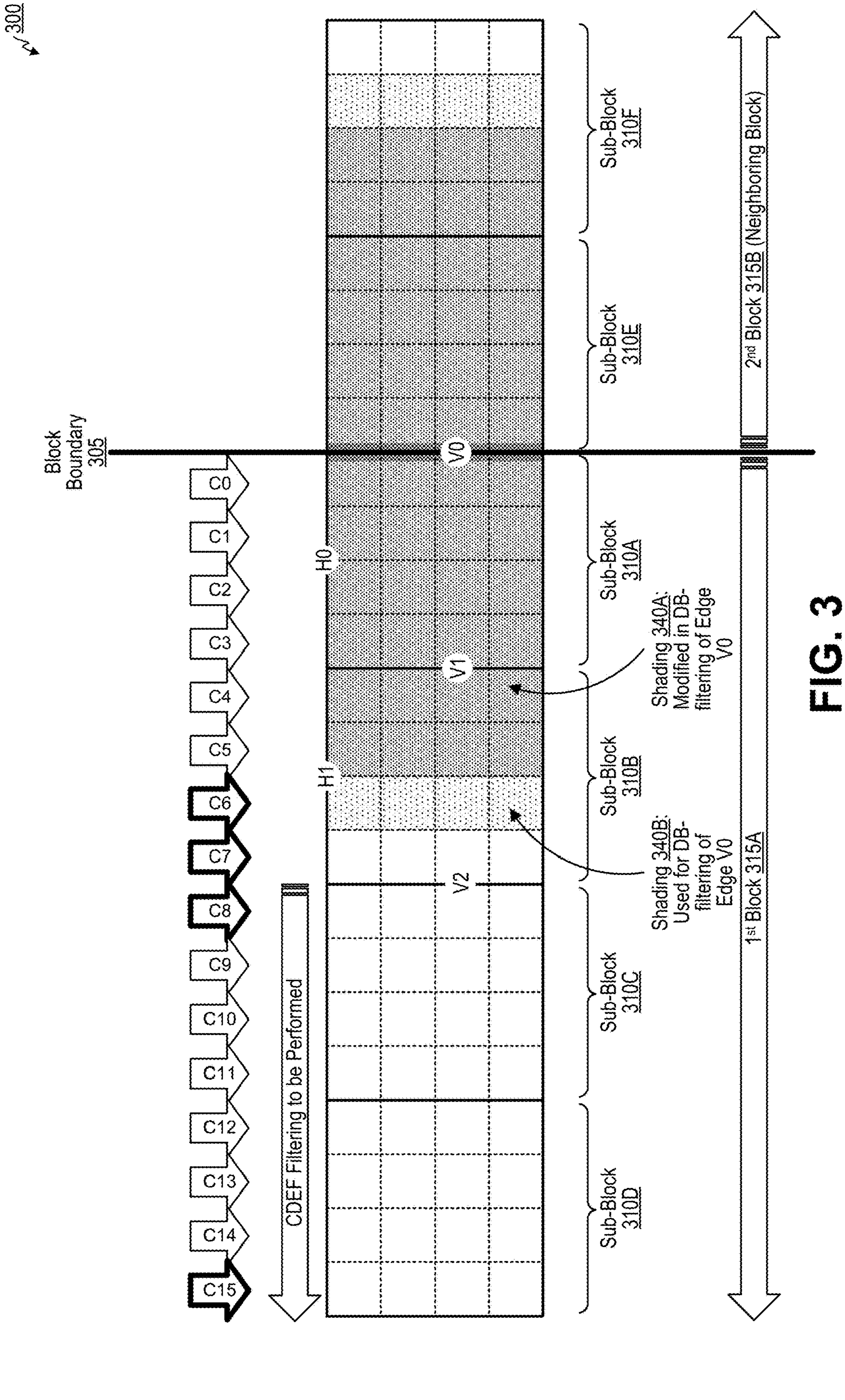
FIG. 3 is a conceptual diagram illustrating a block boundary between a first block and a second block, with both blocks divided into sub-blocks, in accordance with some examples.

FIG. 3 is a conceptual diagram 300 illustrating a block boundary 305 between a first block 315A and a second block 315B, with both blocks divided into sub-blocks 310A-310F. The first block 315A, the second block 315B, and the sub-blocks 310A-310F may each be blocks, superblocks, macroblocks, tiles, CUs, CTUs, or any other block types described herein. The first block 315A and the second block 315B are larger than the sub-blocks 310A-310F. In some examples, the sub-blocks 310A-310F may be referred to as blocks, while the first block 315A and the second block 315B may be referred to as superblocks, macroblocks, and/or tiles.

The sub-blocks 310A-310F represent a row of sub-blocks. Additional sub-blocks may be above or below any of the sub-blocks 310A-310F. There may be additional sub-blocks to the left of the sub-block 310D, and/or to the right of the sub-block 310F. The first block 315A includes sub-blocks 310A-310D, and may include additional sub-blocks beyond the sub-blocks 310A-310D. The second block 315B includes sub-blocks 310E-310F, and may include additional sub-blocks beyond the sub-blocks 310E-310F. In some examples, the dimensions of the first block 315A and/or the second block 315B are 64 pixels by 64 pixels. In some examples, the dimensions of the sub-blocks 310A-310F are 4 pixels by 4 pixels, as illustrated using the dashed lines in each of the sub-blocks 310A-310F. Columns in the sub-blocks 310A-310D of the first block 315A are numbered from C0 to C15 based on how far away the columns are from the block boundary 305 between the first block 315A and the second block 315B. The block boundary 305 may be referred to as the block edge between the first block 315A and the second block 315B.

The block boundary 305 represents the right edge of the first block 315A and/or the left edge of the second block 315B. The AV1 video codec/format specifies that for DB filtering using the DB filter 210, the decoder system 200 first vertically filters blocks and/or sub-blocks of video data using the vertical DB filter 230, and then horizontally filters the blocks and/or sub-blocks of the video data using the horizontal DB filter 235. In some examples, the vertical DB filter 230 and/or the horizontal DB filter 235 use 13-tap filtering for at least some edges. For instance, the vertical DB filter 230 can use 13-tap filtering for edge V0 (e.g., the block boundary 305). In the context of the vertical DB filter 230, 13-tap filtering means that, to perform vertical DB filtering on a specified edge of a block or sub-block of video data, the vertical DB filter 230 uses both pixel data from 7 columns of pixels to the left of the specified edge and 7 columns of pixels to the right of the specified edge, and modifies pixel data in up to 6 columns of pixels to the left of the specified edge and 6 columns of pixels to the right of the specified edge. For example, pixels with shading 340A (e.g., columns C0 through C5, as well as the 6 columns of pixel data in the second block 315A that are nearest to the block boundary 305) can be modified by the vertical DB filter 230 when the vertical DB filter 230 performs vertical DB filtering on the vertical edge V0. The vertical edge V0 represents the part of the block boundary 305 that is a boundary between the sub-block 310A and the sub-block 310E. The vertical DB filter 230 can use the pixels with shading 340B (e.g., column C6 as well as the $7^{th}$ column of pixel data to the right of the block boundary 305) as well as the pixels with shading 340A to perform vertical DB filtering on the vertical edge V0. The pixels with shading 340B are used by the vertical DB filter 230 to perform vertical DB filtering on the vertical edge V0, but are not modified by the vertical DB filter 230 in performing vertical DB filtering on the vertical edge V0. In some examples, the vertical DB filter 230 and/or the horizontal DB filter 235 uses other filtering schemes (other than 13-tap filtering) for other edges than V0, such as edges V1 and/or V2. For instance, in some examples, the vertical DB filter 230 can use 4-tap, 5-tap, 6-tap, 7-tap, or 8-tap filtering for edges V1 and/or V2.

In some examples, pixel data from the second block 315B is not available to the DB filter 210 when the DB filter 210 is used to filter the first block 315A. In such examples, the DB filter 210 cannot perform vertical DB filtering (e.g., using vertical DB filter 230) on any vertical edges of the sub-block 310A of the first block 315A, since pixel data from the second block 315B would be necessary to perform vertical DB filtering on any vertical edges of the sub-block 310A. Because of this, the decoder system 200 stores the pixel data from the sub-block 310A in the neighboring block line buffer 205, retrieves the pixel data from the sub-block 310A from the neighboring block line buffer 205 when performing DB filtering of the second block 315B, and performs DB filtering (e.g., vertical and horizontal) on the edges of the sub-block 310A, and on the block boundary 305, during filtering of the second block 315B.

In some examples, the DB filter 210 applies the horizontal DB filter 235 to horizontal edges of a sub-block only after successfully applying the vertical DB filter 230 to the vertical edges of the sub-block. Thus, if the vertical DB filter 230 does not filter the vertical edges of the sub-block 310 (e.g., edges V0 and V1), the horizontal DB filter 235 will likewise not filter the horizontal edges of the sub-block 310A (e.g., edge H0). The DB filter 210 not filtering the edges of the sub-block 310A can, in turn, prevent the decoder system 200 from applying the CDEF filter 215, the upscaler 220 and/or the LR filter 225 to the sub-block 310A.

In some examples, the DB filter 210 performs DB filtering for an entire sub-block at a time. In some examples where the pixel data from the second block 315B is not available to the DB filter 210 when the DB filter 210 is used to filter the first block 315A, the right edge V1 of the sub-block 310B cannot be vertically filtered by the vertical DB filter 230, though the left edge V2 of the sub-block 310B can be vertically filtered by the vertical DB filter 230, for instance if the right edge V1 is configured for 13-tap filtering. In some examples where the pixel data from the second block 315B is not available to the DB filter 210 when the DB filter 210 is used to filter the first block 315A, the right edge V1 of the sub-block 310B and left edge V2 of the sub-block 310B can both be vertically filtered by the vertical DB filter 230, for instance if the edges V1 and V2 are configured for 4-tap, 5-tap, 6-tap, 7-tap, or 8-tap filtering. The inability to vertically portions of sub-block 310B can prevent the vertical DB filter 230 from fully vertically DB-filtering portions of the sub-block 310B (e.g., near edge V1 due to the 13-tap filtering for edge V0), which in turn can prevent the horizontal DB filter 235 from filtering the horizontal edges of the sub-block 310B (e.g., edge H1). The DB filter 210 not fully filtering the edges of the sub-block 310B can, in turn, prevent the decoder system 200 from applying the CDEF filter 215, the upscaler 220 and/or the LR filter 225 to the sub-block 310B.

In examples where the DB filter 210 performs DB filtering for an entire sub-block at a time, the decoder system 200 can store the pixel data from the sub-block 310B in the neighboring block line buffer 205, as with the pixel data from the sub-block 310A. In such examples, the decoder system 200 then retrieves the pixel data from the sub-blocks 310A-310B from the neighboring block line buffer 205 when performing DB filtering of the second block 315B, and performs DB filtering (e.g., vertical and horizontal) on the edges of the sub-blocks 310A-310B, and on the block boundary 305, during filtering of the second block 315B.

In some examples, the CDEF filter 215 filters an 8 pixel by 8 pixel area at a time in the luma space, and a 4 pixel by 4 pixel area at a time in the chroma space. In some examples, the CDEF filter 215 uses 5-tap filtering. Thus, to filter a specified area of pixels using CDEF filtering, the CDEF filtering algorithm uses both pixel data from 2 columns of pixels to the left of the specified area of pixels and 2 columns of pixels to the right of the specified area of pixels. In some examples, any data that the CDEF filter 215 uses for CDEF filtering needs to already be fully DB filtered by the DB filter 210 (e.g., vertically DB filtered by the vertical DB filter 230 as well as horizontally DB filtered by the horizontal DB filter 235). Thus, in order to perform CDEF filtering on an area that includes the sub-blocks 310C-310D (e.g., between column C8 and column C15), the CDEF filter 215 is configured to use fully DB-filtered pixel data from columns C7 and C6. Column C6 is six pixels horizontally away (e.g., leftward) from the block boundary 305. Column C7 is seven pixels horizontally away (e.g., leftward) from the block boundary 305. However, in examples where the DB filter 210 performs DB filtering for an entire sub-block at a time as described above, the DB filter 210 does not perform DB-filtering on the pixel data in columns C7 and C6. This, in turn, prevents the CDEF filter 215 from being able to perform CDEF filtering on the area that includes the sub-blocks 310C-310D (e.g., between column C8 and column C15).

Figure 5:
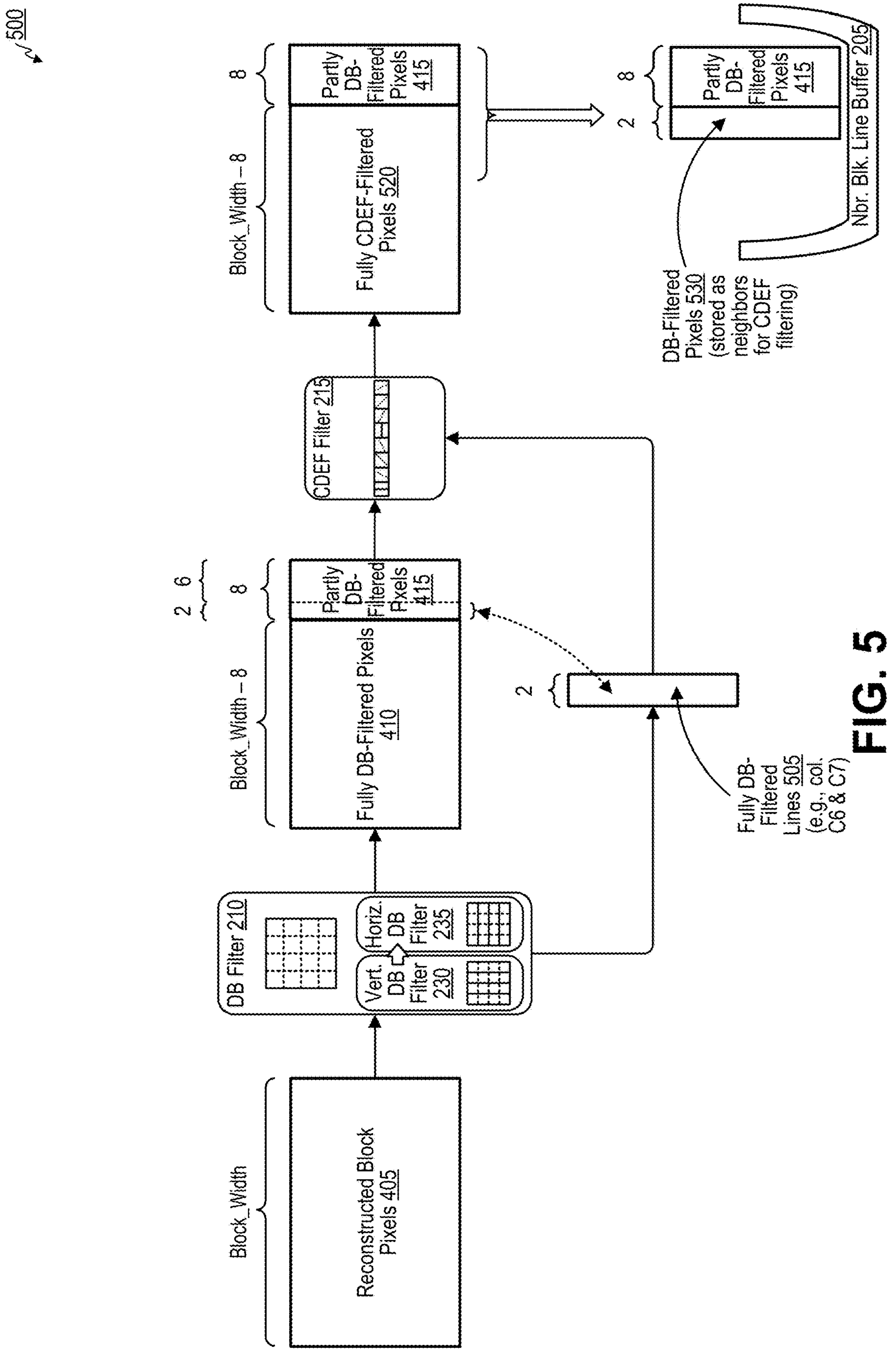
FIG. 5 is a block diagram illustrating a decoder system that applies a deblocking (DB) filter and a constrained directional enhancement filter (CDEF) to a block of video data, with partial sub-block DB-filtering used to allow more of the block to be CDEF-filtered than under the decoder system of FIG. 4, in accordance with some examples.

However, in some examples where the vertical DB filtering algorithm uses 13-tap filtering as described above, the vertical DB filter 230 can perform vertical DB filtering for the left edge V2 of the sub-block 310B, and for the pixel data in the columns C6 and C7 of the sub-block 310B. For instance, column C7 is neither used nor modified by vertical DB filtering of the block boundary 305, while column C6 is used but not modified by the vertical DB filtering of the block boundary 305. Because the vertical DB filter 230 can perform vertical DB filtering on the pixel data in the columns C6 and C7 of the sub-block 310B, the horizontal DB filter 230 can perform horizontal DB filtering for portions of the horizontal edges (e.g., edge H1) of the sub-block 310B that are in columns C6 and C7 of the sub-block 310B. Thus, the DB filter 210 can fully DB-filter the pixel data in columns C6 and C7 of the sub-block 310B, without fully DB-filtering other portions of the sub-block 310B (e.g., columns C4 and C5). In examples where the CDEF filter 215 uses 5-tap filtering as described above, the DB filter 210 performing full DB-filtering on columns C6 and C7 of the sub-block 310B allows the CDEF filter 215 to perform full CDEF filtering on the area that includes the sub-blocks 310C-310D (e.g., between column C8 and column C15). The CDEF filter 215 being able to perform full CDEF filtering on the area that includes the sub-blocks 310C-310D (e.g., between column C8 and column C15) in turn allows the decoder system 200 to perform upscaling of this area using the upscaler 220, and/or to perform LR filtering of this area (as upscaled) using the LR filter 225. The CDEF filter 215 being able to perform full CDEF filtering on this area thus eliminates the need for the decoder system 200 to store DB-filtered pixel data from the sub-blocks 310C-310D in the neighboring block line buffer 205. In some examples, this decreases how much data is to be stored in the neighboring block line buffer 205 by 44%. An example of this filtering process that CDEF-filters the sub-blocks 310C-310D, and thus does not need to store the DB-filtered pixel data of the sub-blocks 310C-310D in the neighboring block line buffer 205, is illustrated in FIG. 5.

FIG. 4 is a block diagram illustrating a decoder system 400 that applies a deblocking (DB) filter 210 and a constrained directional enhancement filter (CDEF) 215 to a block of video data. The decoder system 400 can be an example of the decoding device 112, the decoder engine 116, the decoder system 200, the codec system that performs the codec process 600, the computing system 700, or a combination thereof.

The decoder system 400 receives reconstructed block pixels 405. The reconstructed block pixels 405 may be reconstructed from an encoded video, such as a video encoded using the encoding device 104. Examples of the reconstructed block pixels 405 include the output 110, the input 114, the input video data 270, the video data of operation 605, or a combination thereof. In some examples, the reconstructed block pixels 405 are received using the communications link 120. In some examples, the reconstructed block pixels 405 are at least partially decoded using the decoding device 112 (e.g., using the decoder engine 116), for instance by performing entropy decoding, rescaling, and/or an inverse transform as discussed with respect to FIG. 1. The reconstructed block pixels 405 include a block having a block width identified as Block_Width. An example of the block includes the first block 315A or the second block 315B.

The DB filter 210 performs DB filtering (e.g., vertical DB filtering using the vertical DB filter 230 and/or horizontal DB filtering using the horizontal DB filter 235) on the reconstructed block pixels 405 to generate DB-filtered block data 245 that includes fully DB-filtered pixels 410 and partly-DB-filtered pixels 415. The partly-DB-filtered pixels 415 may have a width of 8 pixels, and may include, for example, the two sub-blocks in the reconstructed block pixels 405 that are furthest to the right in the reconstructed block pixels 405. For instance, if the reconstructed block pixels 405 is the first block 315A, the partly-DB-filtered pixels 415 may include columns C0 through C7 (e.g., sub-blocks 310A-310B). In some examples, the partly-DB-filtered pixels 415 may be partially DB-filtered using the DB filter 210, for example with columns C7 and/or C6 being vertically and/or horizontally DB filtered. In some examples, the partly-DB-filtered pixels 415 may be not DB filtered using the DB filter 210 at all. The fully DB-filtered pixels 410 include the rest of the reconstructed block pixels 405. For instance, if the reconstructed block pixels 405 is the first block 315A, the fully DB-filtered pixels 410 can include columns C8 to C15 (e.g., including sub-blocks 310C-310D), and any other columns of the first block 315A beyond column C15. In examples where the partly-DB-filtered pixels 415 have a width of 8 pixels, the width of the area of the fully DB-filtered pixels 410 is Block_Width−8 pixels.

The decoder system 400 applies the CDEF filter 215 to the fully DB-filtered pixels 410 to generate the fully CDEF-filtered pixels 420. In examples where the DB filter 210 performs DB filtering for an entire sub-block at a time as described above, and where the DB filter 210 does not generate at least two columns of fully DB-filtered pixel data in the partly DB-filtered pixels 415, there is an area of DB-filtered pixels 425 in the fully DB-filtered pixels 410 that the CDEF filter 215 cannot filter, and that therefore do not end up being CDEF-filtered. In some examples, the DB-filtered pixels 425 that are not CDEF-filtered after application of the CDEF filter 215 represent an area that is 8 pixels wide. Thus, the width of the area of the fully CDEF-filtered pixels 420 is Block_Width−16 pixels.

In some examples, the decoder system 400 stores the partly DB-filtered pixels 415, the DB-filtered pixels 425 that are not CDEF-filtered, and an additional 2 columns of DB-filtered pixels 430 in the neighboring block line buffer 205, for a total of 18 columns of pixels. The neighboring block line buffer 205 is illustrated as a storage container in FIG. 4. In such examples, when the decoder system 400 moves on to decoding and/or filtering the next block to the right of the block in the reconstructed block pixels 405 after decoding and/or filtering the block in the reconstructed block pixels 405 (e.g., moves on to decoding and/or filtering the second block 315B after decoding and/or filtering the first block 315A), the decoder system 400 retrieves and filters the data from the neighboring block line buffer 205 along with filtering the data in the next block (e.g., the second block 315B). For instance, the decoder system 400 retrieves the partly DB-filtered pixels 415 from the neighboring block line buffer 205, the DB-filtered pixels 425, and/or the additional 2 DB-filtered pixels 430, and uses at least some of these as inputs to the DB filter 210 to fully DB-filter the partly DB-filtered pixels 415. The decoder system 400 applies the CDEF filter 215 to the DB-filtered pixels 425 that are not CDEF-filtered, and the additional 2 DB-filtered pixels 430, and the fully DB-filtered variant of the partly DB-filtered pixels 415, to CDEF-filter the DB-filtered pixels 425 and the fully DB-filtered variant of the partly DB-filtered pixels 415. The decoder system 400 is then able to apply the upscaler 220 and/or the LR filter 225 to the resulting pixel data.

FIG. 5 is a block diagram illustrating a decoder system 500 that applies a deblocking (DB) filter 210 and a constrained directional enhancement filter (CDEF) 215 to a block of video data, with partial sub-block DB-filtering used to allow more of the block to be CDEF-filtered than under the decoder system 400 of FIG. 4. The decoder system 500 can be an example of the decoding device 112, the decoder engine 116, the decoder system 200, the codec system that performs the codec process 600, the computing system 700, or a combination thereof.

The decoder system 500 receives the reconstructed block pixels 405 as discussed with respect to the decoder system 400. The DB filter 210 of the decoder system 500 performs DB filtering (e.g., vertical DB filtering using the vertical DB filter 230 and/or horizontal DB filtering using the horizontal DB filter 235) on the reconstructed block pixels 405 to generate the DB-filtered block data 245 that includes the fully DB-filtered pixels 410 and the partly-DB-filtered pixels 415, as with the decoder system 400. However, in the decoder system 500, the DB filter 210 of the decoder system 500 generates two fully DB-filtered lines 505 (e.g., column C7 and C6 of the sub-block 310B). In some examples, the partly-DB-filtered pixels 415 may include the two fully DB-filtered lines 505. In some examples, the fully DB-filtered pixels 410 may include the two fully DB-filtered lines 505. In some examples, the DB filter 210 of the decoder system 500 generates two fully DB-filtered lines 505 separately from the partly-DB-filtered pixels 415 and/or the fully DB-filtered pixels 410.

The decoder system 500 uses the two fully DB-filtered lines 505 as inputs to the CDEF filter 215, allowing the CDEF filter 215 to perform full CDEF filtering on the subset of the fully DB-filtered pixels 410 that became the DB-filtered pixels 425 in FIG. 4. Thus, by using the two fully DB-filtered lines 505 as inputs to the CDEF filter 215, the CDEF filter 215 of the decoder system 500 generates fully CDEF-filtered pixels 520. The width of the area of the fully CDEF-filtered pixels 520 is Block_Width−8 pixels. Thus, the decoder system 500 is able to generate an area of fully CDEF-filtered pixels 520 that is 8 pixels wider than the fully CDEF-filtered pixels 420 generated using the decoder system 400.

Because the decoder system 500 is able to fully CDEF-filter all of the fully DB-filtered pixels 410 to generate the fully CDEF-filtered pixels 520, the decoder system 500 need only store the partly DB-filtered pixels 415 and 2 additional columns of DB-filtered pixels 530, for a total of 10 columns of pixels. In some examples, this decreases how much data is to be stored in the neighboring block line buffer 205 by 44%. In some examples, when the decoder system 500 moves on to decoding and/or filtering the next block to the right of the block in the reconstructed block pixels 405 after decoding and/or filtering the block in the reconstructed block pixels 405 (e.g., moves on to decoding and/or filtering the second block 315B after decoding and/or filtering the first block 315A), the decoder system 500 retrieves and filters the data from the neighboring block line buffer 205 along with filtering the data in the next block (e.g., the second block 315B). For instance, the decoder system 500 retrieves the partly DB-filtered pixels 415 and/or the additional 2 DB-filtered pixels 530, and applies the DB filter 210, the CDEF filter 215, the upscaler 220, and/or the LR filter 225.

In some examples, in the decoder system 500 with 4:2:0 chroma sub-sampling where the neighboring block is located to the left of the first block in the video frame, the amount of data written to, stored in, and read from the neighboring block line buffer 205 from and/or for the DB filter 210 can be determined as follows:

$$DB\ \text{Luma left}\ nbr\ \text{buffer size} = 8 * \text{Luma\_Tile\_Height}$$

$$DB\ CB\ \text{left}\ nbr\ \text{buffer size} = 4 * \text{Luma\_Tile\_Height} * 1/2$$

$$DB\ CR\ \text{left}\ nbr\ \text{buffer size} = 4 * \text{Luma\_Tile\_Height} * 1/2$$

In some examples, in a decoder system 500 with 4:2:0 chroma sub-sampling where the neighboring block is located to the left of the first block in the video frame, the amount of data written to, stored in, and read from the neighboring block line buffer 205 from and/or for the CDEF filter 215 can be determined as follows:

$$CDEF\ \text{Luma left}\ nbr\ \text{buffer size} = 2 * \text{Luma\_Tile\_Height}$$

$$CDEF\ CB\ \text{left buffer size} = 2 * \text{Luma\_Tile\_Height} * 1/2$$

$$CDEF\ CR\ \text{left buffer size} = 2 * \text{Luma\_Tile\_Height} * 1/2$$

In some examples, in a decoder system 500 with 4:2:0 chroma sub-sampling where the neighboring block is located to the left of the first block in the video frame, the total amount of data written to, stored in, and read from the neighboring block line buffer 205 (e.g., from and/or for the DB filter 210 and/or the CDEF filter 215) can be determined as follows:

$$\text{Total}\ (DB + CDEF)\ \text{left}\ nbr\ \text{buffer size} = (16 * \text{Luma\_Tile\_Height})$$

In some examples, in a frame configured for the DB filter 210 and/or the CDEF filter 215, having two vertical tiles and no horizontal tile, the tile height may be equal to the frame height. For a frame height H, the total amount of data written to, stored in, and read from the neighboring block line buffer 205 (e.g., from and/or for the DB filter 210 and/or the CDEF filter 215) can be determined as follows:

$$\text{Total } (DB + CDEF) \text{ left } nbr \text{ buffer size} = 16 * H \text{ pixels}$$

In some examples, for frame rate (F frames per see), minimum read/write memory bandwidth for writing data to and/or reading data from the neighboring block line buffer 205 is:

$$\text{Memory Bandwidth} = 16 * H * F \text{ pixels/sec}$$

Accordingly, the decoder system 500 of FIG. 5 reduces an amount of data to be stored in the neighboring block buffer 205 compared to the decoder system 400 of FIG. 4. The decoder system 500 of FIG. 5 reduces memory bandwidth usage for writing data to and/or reading data from the neighboring block line buffer 205 compared to the decoder system 400 of FIG. 4. The decoder system 500 of FIG. 5 makes these improvements over the decoder system 400 of FIG. 4 at least by fully applying the DB filter 210 to a portion (the fully DB-filtered lines 505) of a sub-block (e.g., sub-block 310B) of the block (the reconstructed block pixels 405). This allows the CDEF filter 215 of the decoder system 500 to apply full CDEF filtering to a larger portion of the reconstructed block pixels 405 (e.g., the fully CDEF-filtered pixels 520 with width Block_Width-8) than the CDEF filter 215 of the decoder system 400 is able to fully CDEF filter (e.g., the fully CDEF-filtered pixels 420 with width Block_Width-16).

FIG. 6 is a flow diagram illustrating a codec process 600. The codec process 600 may be performed by a codec system. In some examples, the codec system can include, for example, the video source 102, the encoding device 104, the encoding engine 106, the storage 108, the output 110, the communications link 120, the decoding device 112, the input 114, the decoder engine 116, the storage 118, the video destination device 122, the decoder system 200, the line buffer 440, the computing system 700, the processor 710, an apparatus, a non-transitory computer-readable medium that stores instructions for execution by one or more processors, a mobile handset, a head-mounted display (HMD), a wireless communication device, or a combination thereof.

At operation 605, the codec system is configured to, and can, apply a deblocking (DB) filter to a plurality of sub-blocks of a block of the video data to generate a DB-filtered plurality of sub-blocks. The plurality of sub-blocks are less than an entirety of sub-blocks within the block. Examples the DB filter include the DB filter 210, the vertical DB filter 230, the horizontal DB filter 235, or a combination thereof. Examples of the video data include the output 110, the input 114, the input video data 270, the first block 315A, the second block 315B, the sub-blocks 310A-310F, the reconstructed block pixels 405, other video data described herein, or a combination thereof. Examples of the block of the video data include the first block 315A, the second block 315B, the reconstructed block pixels 405, another block described herein, or a combination thereof. The DB-filtered plurality of sub-blocks can be part of the DB-filtered block data 245, the fully DB-filtered pixels 410, or a combination thereof.

In the context of the first block 315A, the plurality of sub-blocks can include the sub-block 310C, the sub-block 310D, and any additional sub-blocks (not illustrated) to the left of the sub-block 310D in the first block 315A. In the context of the reconstructed block pixels 405, the plurality of sub-blocks can include the sub-blocks of the reconstructed block pixels 405 that, when DB filtered using the DB filter, become the fully DB-filtered pixels 410.

In some examples, the codec system receives the video data from an image sensor. In some examples, the codec system includes the image sensor. In some examples, the codec system includes an image sensor connector that couples and/or connects the image sensor to a remainder of the codec system (e.g., including the processor and/or the memory of the codec system). In some examples, the codec system receives the image data from the image sensor by receiving the image data from, over, and/or using the image sensor connector. Examples of the image sensor include the image sensor 130.

In some aspects, the codec system is configured to, and can, encode the video data using a video encoder, and receive the video data from the video encoder before applying the DB filter to the plurality of sub-blocks of the block. The encoding device 104 and/or encoding engine 106 are examples of the video encoder.

At operation 610, the codec system is configured to, and can, apply the DB filter to one or more lines of pixels in an additional sub-block of the block to generate a DB-filtered portion of the additional sub-block. The one or more lines of pixels in the additional sub-block are filtered without filtering an entirety of the additional sub-block using the DB filter. The additional sub-block is adjacent to at least one of the plurality of sub-blocks. The DB-filtered portion of the additional sub-block can be part of the DB-filtered block data 245. The one or more lines of pixels may include one or more columns of pixels, one or more rows of pixels, or a combination thereof.

In the context of the first block 315A, the additional sub-block can include at least the sub-block 310B and/or any additional sub-blocks of the first block 315A that includes columns C6 and C7 (e.g., additional sub-block(s) above and below sub-block 310B in the first block 315A). For instance, the sub-block 310B is adjacent to the sub-block 310C, which can be one of the plurality of sub-blocks. In the context of the first block 315A and the sub-block 310B, the one or more lines of pixels that are filtered by applying the DB filter in operation 610 can include columns C6 and C7. In the context of the first block 315A and the sub-block 310B, the codec system can apply the DB filter to fully DB-filter columns C6 and C7 without DB-filtering columns C4 and C5 (or at least without fully DB-filtering columns C4 and C5—in some examples, columns C4 and C5 can be partially DB-filtered).

In the context of the reconstructed block pixels 405, the additional sub-block can include sub-block(s) in the partly DB-filtered pixels 415. More specifically, in the context of the reconstructed block pixels 405, the additional sub-block can include at least the sub-block(s) that include the fully-DB-filtered lines 505. For instance, the sub-block(s) that include the fully-DB-filtered lines 505 are adjacent to some of the sub-blocks on the right-hand side of the fully DB-filtered pixels 410, which can be examples of the plurality of sub-blocks. In the context of the reconstructed block pixels 405, the one or more lines of pixels that are filtered by applying the DB filter in operation 610 can include the fully-DB-filtered lines 505. In the context of the reconstructed block pixels 405, the codec system can apply the DB filter to fully DB-filter the fully-DB-filtered lines 505 without DB-filtering the entirety of the sub-block(s) in the partly DB-filtered pixels 415 that include the fully-DB-filtered lines 505 (or at least without fully DB-filtering the entirety of the sub-block(s) in the partly DB-filtered pixels 415 that include the fully-DB-filtered lines 505—in some examples, at least some of the remainder of these sub-block(s) of the partly DB-filtered pixels 415 can be partially DB-filtered).

In some aspects, the one or more lines of pixels in the block include at least two lines of pixels in the block that are adjacent to one another. In some aspects, the one or more lines of pixels in the block include at least two lines of pixels in the block that are parallel to one another. For instance, the one or more lines of pixels can include the columns C6 and C7 of the sub-block 310B and/or of the first block 315A, and the columns C6 and C7 are both adjacent to one another and parallel to one another. Likewise, the fully DB-filtered lines 505 are illustrated in FIG. 5 as including two columns of pixels that are both adjacent to one another and parallel to one another.

In some aspects, the one or more lines of pixels in the block include are each at least six pixels away from an edge of the block. In some aspects, the edge of the block is a vertical edge along a side of the block, such as the edge V0, the block boundary 305, and the rightmost edge of the reconstructed block pixels 405. In some examples, the one or more lines of pixels include one or more columns of pixels that are each at least six pixels horizontally away from the vertical edge. In some aspects, the side of the block is a right side of the block, and the one or more columns of pixels are each at least six pixels leftward of the vertical edge along the right side of the block.

For instance, the one or more lines of pixels can include the columns C6 and C7 of the sub-block 310B and/or of the first block 315A, and the columns C6 and C7 are both at least six pixels away (e.g., leftward) from the edge V0, which is part of the block boundary 305 at the right side of the first block 315A. The block boundary 305 of the first block 315A can be referred to as the edge of the first block 315A. Likewise, the fully DB-filtered lines 505 are illustrated in FIG. 5 as including two columns of pixels on the leftmost side of the 8-pixel-wide set of partly DB-filtered pixels 415, meaning that the fully DB-filtered lines 505 are at least six pixels away (e.g., leftward) from the rightmost edge of the block (e.g., the rightmost edge of the reconstructed block pixels 405).

In some aspects, the DB filter is applied to the plurality of sub-blocks and at least one of the one or more lines of pixels in the additional sub-block to filter the plurality of sub-blocks to generate the DB-filtered plurality of sub-blocks.

In some aspects, the additional sub-block and each of the plurality of sub-blocks have a size of 4 pixels by 4 pixels. For instance, the sub-blocks 310A-310F are illustrated in FIG. 3 as having a size of 4 pixels by 4 pixels. In some aspects, sub-blocks may have other sizes. For instance, in some aspects, a block size of the block, or a sub-block size of the plurality of sub-blocks and/or the additional sub-block, may be 2 pixels by 2 pixels, 3 pixels by 3 pixels, 4 pixels by 4 pixels, 5 pixels by 5 pixels, 6 pixels by 6 pixels, 8 pixels by 8 pixels, 10 pixels by 10 pixels, 12 pixels by 12 pixels, 16 pixels by 16 pixels, 32 pixels by 32 pixels, 64 pixels by 64 pixels, 128 pixels by 128 pixels, 256 pixels by 256 pixels, 512 pixels by 512 pixels, or another size. The sizes of each of the sub-blocks may be smaller than the size of the block.

In some aspects, the codec system is configured to, and can, store a partially-DB-filtered portion of the block in a neighboring block buffer. The codec system can be configured to, and can, apply at least one filter to the partially-DB-filtered portion of the block from the neighboring block buffer and to a second block that neighbors the block to filter the second block. Examples of the neighboring block buffer include the neighboring block buffer 205. Examples of the second block include the second block 315B. Examples of store a partially-DB-filtered portion of the block in a neighboring block buffer are illustrated in FIGS. 4 and 5. In some aspects, the partially-DB-filtered portion of the block includes the additional sub-block and/or the DB-filtered portion of the additional sub-block. For instance, the partly DB-filtered pixels 415, the fully DB-filtered lines 505, and/or the DB-filtered pixels 530 may include the additional sub-block and/or the DB-filtered portion of the additional sub-block, and may be stored in the neighboring block buffer 205 as illustrated in FIG. 5. In some aspects, a height of the partially-DB-filtered portion of the block is a height of the block, and a width of the partially-DB-filtered portion of the block is less than a total width of four sub-blocks. In some aspects, a height of the partially-DB-filtered portion of the block is a height of the block, and wherein a width of the partially-DB-filtered portion of the block is at most 10 pixels. For instance, the height of the partly DB-filtered pixels 415, the fully DB-filtered lines 505, and/or the DB-filtered pixels 530 stored in the neighboring block buffer 205 in FIG. 5 may be the height of the block (the height of the reconstructed block pixels 405), and the total width of the data stored in the stored in the neighboring block buffer 205 in FIG. 5 is 10 pixels. If sub-blocks have a size of 4 pixels by 4 pixels, then the total width of four sub-blocks is 12 pixels, and the 10 pixel width of the data stored in the stored in the neighboring block buffer 205 in FIG. 5 is less than the 12 pixel total width of four sub-blocks.

At operation 615, the codec system is configured to, and can, apply a constrained directional enhancement filter (CDEF) to the DB-filtered plurality of sub-blocks and the DB-filtered portion of the additional sub-block to generate a CDEF-filtered plurality of sub-blocks. Examples of the CDEF filter include the CDEF filter 215. Examples of the CDEF-filtered plurality of sub-blocks include the CDEF-filtered block data 250, the upscaled CDEF-filtered block data 255, the sub-blocks 310C-310D (and any additional sub-blocks to the left of the sub-block 310D in the first block 315A) as indicated by the "CDEF filtering to be Performed" indicator arrow, the fully CDEF-filtered pixels 420, and the fully CDEF-filtered pixels 520.

In some aspects, one or more of the methods, apparatuses, and computer-readable medium described above further comprise: upscaling the CDEF-filtered plurality of sub-blocks to generate an upscaled-CDEF-filtered plurality of sub-blocks; and applying a loop restoration (LR) filter to the upscaled-CDEF-filtered plurality of sub-blocks to generate output block data. In some aspects, one or more of the methods, apparatuses, and computer-readable medium described above further comprise: outputting the output block data for storage in at least one memory. In some aspects, one or more of the methods, apparatuses, and computer-readable medium described above further comprise: causing the output block data to be displayed according to the video data using a display. In some aspects, one or more of the methods, apparatuses, and computer-readable medium described above further comprise: causing the output block data to be transmitted to a recipient device using a communication interface.

In some examples, the imaging system can includes: means for applying a deblocking (DB) filter to a plurality of sub-blocks of a block of video data to generate a DB-filtered plurality of sub-blocks, the plurality of sub-blocks being less than an entirety of sub-blocks within the block; means for applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and means for applying a constrained directional enhancement filter (CDEF) to the DB-filtered plurality of sub-blocks and the DB-filtered portion of the additional sub-block to generate a CDEF-filtered plurality of sub-blocks.

In some examples, the means for applying the DB filter to the plurality of sub-blocks, and for applying the DB filter to one or more lines of pixels in an additional sub-block, includes the decoding device 112, the decoder engine 116, the decoder system 200, the DB filter 210, the vertical DB filter 230, the horizontal DB filter 235, the decoder system 400, the decoder system 500, the codec system that performs the codec process 600, the computing system 700, or a combination thereof.

In some examples, the means for applying the CDEF filter to the DB-filtered plurality of sub-blocks and the DB-filtered portion of the additional sub-block includes the decoding device 112, the decoder engine 116, the decoder system 200, the CDEF filter 215, the decoder system 400, the decoder system 500, the codec system that performs the codec process 600, the computing system 700, or a combination thereof.

In some examples, the processes described herein (e.g., the respective processes of FIGS. 1, 2, 3, 4, 5, the codec process 600 of FIG. 6, and/or other processes described herein) may be performed by a computing device or apparatus. In some examples, the processes described herein can be performed by, and/or using, the video source 102, the encoding device 104, the encoding engine 106, the storage 108, the output 110, the communications link 120, the decoding device 112, the input 114, the decoder engine 116, the storage 118, the video destination device 122, the decoder system 200, the line buffer 440, the computing system 700, the processor 710, an apparatus, a non-transitory computer-readable medium that stores instructions for execution by one or more processors, a mobile handset, a head-mounted display (HMD), a wireless communication device, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. In some examples, performance of certain operations described herein can be responsive to performance of other operations described herein.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
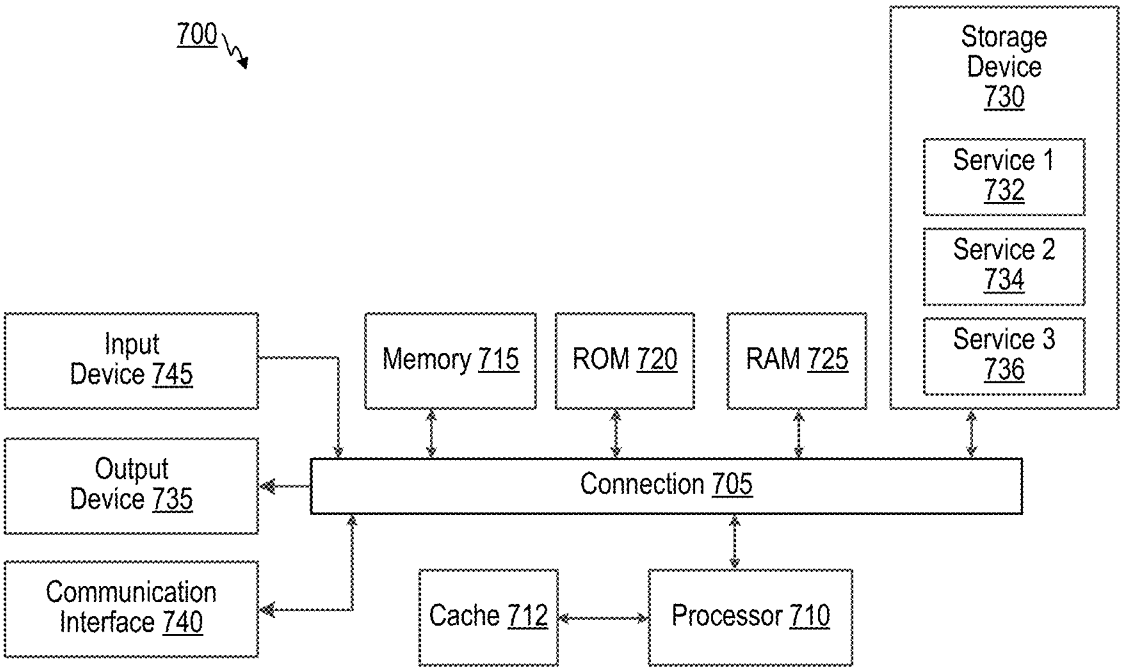
FIG. 7 is a diagram illustrating an example of a computing system for implementing certain aspects described herein.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some aspects, computing system 700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 702.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some aspects, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” means A, B, or A and B. In another example, claim language reciting “at least one of A, B, and C” means A, B, C, or A and B, or A and C, or B and C, or A and B and C. The language “at least one of” a set and/or “one or more” of a set does not limit the set to the items listed in the set. For example, claim language reciting “at least one of A and B” can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: apply a deblocking (DB) filter to a plurality of sub-blocks of a block of the video data to generate a DB-filtered plurality of sub-blocks, the plurality of sub-blocks being less than an entirety of sub-blocks within the block; apply the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and apply a constrained directional enhancement filter (CDEF) to the DB-filtered plurality of sub-blocks and the DB-filtered portion of the additional sub-block to generate a CDEF-filtered plurality of sub-blocks.

Aspect 2. The apparatus of Aspect 1, wherein the one or more lines of pixels in the block include at least two lines of pixels in the block that are adjacent to one another.

Aspect 3. The apparatus of any of Aspects 1 to 2, wherein the one or more lines of pixels in the block include are each at least six pixels away from an edge of the block.

Aspect 4. The apparatus of Aspect 3, wherein the edge of the block is a vertical edge along a side of the block, and wherein the one or more lines of pixels include one or more columns of pixels that are each at least six pixels horizontally away from the vertical edge.

Aspect 5. The apparatus of Aspect 4, wherein the side of the block is a right side of the block, and wherein the one or more columns of pixels are each at least six pixels leftward of the vertical edge along the right side of the block.

Aspect 6. The apparatus of any of Aspects 1 to 5, wherein the DB filter is applied to the plurality of sub-blocks and at least one of the one or more lines of pixels in the additional sub-block to filter the plurality of sub-blocks to generate the DB-filtered plurality of sub-blocks.

Aspect 7. The apparatus of any of Aspects 1 to 6, wherein the additional sub-block and each of the plurality of sub-blocks have a size of 4 pixels by 4 pixels.

Aspect 8. The apparatus of any of Aspects 1 to 7, wherein the at least one processor is configured to: store a partially-DB-filtered portion of the block in a neighboring block buffer; and apply at least one filter to the partially-DB-filtered portion of the block from the neighboring block buffer and to a second block that neighbors the block to filter the second block.

Aspect 9. The apparatus of Aspect 8, wherein the partially-DB-filtered portion of the block includes the additional sub-block.

Aspect 10. The apparatus of any of Aspects 8 to 9, wherein the partially-DB-filtered portion of the block includes the DB-filtered portion of the additional sub-block.

Aspect 11. The apparatus of any of Aspects 8 to 10, wherein a height of the partially-DB-filtered portion of the block is a height of the block, and wherein a width of the partially-DB-filtered portion of the block is less than a width of four sub-blocks.

Aspect 12. The apparatus of any of Aspects 8 to 11, wherein a height of the partially-DB-filtered portion of the block is a height of the block, and wherein a width of the partially-DB-filtered portion of the block is at most 10 pixels.

Aspect 13. The apparatus of any of Aspects 1 to 12, wherein the at least one processor is configured to: upscale the CDEF-filtered plurality of sub-blocks to generate an upscaled-CDEF-filtered plurality of sub-blocks; and apply a loop restoration (LR) filter to the upscaled-CDEF-filtered plurality of sub-blocks to generate output block data.

Aspect 14. The apparatus of Aspect 13, wherein the at least one processor is configured to: output the output block data for storage in the at least one memory.

Aspect 15. The apparatus of any of Aspects 13 to 14, further comprising: a display configured to display the output block data according to the video data.

Aspect 16. The apparatus of any of Aspects 13 to 15, further comprising: a communication interface configured to transmit the output block data to a recipient device.

Aspect 17. The apparatus of any of Aspects 1 to 16, further comprising: a video encoder configured to encode the video data, wherein the at least one processor is configured to receive the video data from the video encoder before applying the DB filter to the plurality of sub-blocks of the block.

Aspect 18. The apparatus of any of Aspects 1 to 17, wherein the apparatus includes at least one of a head-mounted display (HMD), a mobile handset, or a wireless communication device.

Aspect 19. An method for video decoding, the method comprising: applying a deblocking (DB) filter to a plurality of sub-blocks of a block of video data to generate a DB-filtered plurality of sub-blocks, the plurality of sub-blocks being less than an entirety of sub-blocks within the block; applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and applying a constrained directional enhancement filter (CDEF) to the DB-filtered plurality of sub-blocks and the DB-filtered portion of the additional sub-block to generate a CDEF-filtered plurality of sub-blocks.

Aspect 20. The method of Aspect 19, wherein the one or more lines of pixels in the block include at least two lines of pixels in the block that are adjacent to one another.

Aspect 21. The method of any of Aspects 19 to 20, wherein the one or more lines of pixels in the block include are each at least six pixels away from an edge of the block.

Aspect 22. The method of Aspect 21, wherein the edge of the block is a vertical edge along a side of the block, and wherein the one or more lines of pixels include one or more columns of pixels that are each at least six pixels horizontally away from the vertical edge.

Aspect 23. The method of Aspect 22, wherein the side of the block is a right side of the block, and wherein the one or more columns of pixels are each at least six pixels leftward of the vertical edge along the right side of the block.

Aspect 24. The method of any of Aspects 19 to 23, wherein the DB filter is applied to the plurality of sub-blocks and at least one of the one or more lines of pixels in the additional sub-block to filter the plurality of sub-blocks to generate the DB-filtered plurality of sub-blocks.

Aspect 25. The method of any of Aspects 19 to 24, wherein the additional sub-block and each of the plurality of sub-blocks have a size of 4 pixels by 4 pixels.

Aspect 26. The method of any of Aspects 19 to 25, further comprising: storing a partially-DB-filtered portion of the block in a neighboring block buffer; and applying at least one filter to the partially-DB-filtered portion of the block from the neighboring block buffer and to a second block that neighbors the block to filter the second block.

Aspect 27. The method of Aspect 26, wherein the partially-DB-filtered portion of the block includes the additional sub-block.

Aspect 28. The method of any of Aspects 26 to 27, wherein the partially-DB-filtered portion of the block includes the DB-filtered portion of the additional sub-block.

Aspect 29. The method of any of Aspects 26 to 28, wherein a height of the partially-DB-filtered portion of the block is a height of the block, and wherein a width of the partially-DB-filtered portion of the block is less than a width of four sub-blocks.

Aspect 30. The method of any of Aspects 26 to 29, wherein a height of the partially-DB-filtered portion of the block is a height of the block, and wherein a width of the partially-DB-filtered portion of the block is at most 10 pixels.

Aspect 31. The method of any of Aspects 19 to 30, further comprising: upscaling the CDEF-filtered plurality of sub-blocks to generate an upscaled-CDEF-filtered plurality of sub-blocks; and applying a loop restoration (LR) filter to the upscaled-CDEF-filtered plurality of sub-blocks to generate output block data.

Aspect 32. The method of Aspect 31, further comprising: outputting the output block data for storage in at least one memory.

Aspect 33. The method of any of Aspects 31 to 32, further comprising: causing the output block data to be displayed according to the video data using a display.

Aspect 34. The method of any of Aspects 31 to 33, further comprising: causing the output block data to be transmitted to a recipient device using a communication interface.

Aspect 35. The method of any of Aspects 19 to 34, further comprising: encoding the video data using a video encoder; and receiving the video data from the video encoder before applying the DB filter to the plurality of sub-blocks of the block.

Aspect 36. The method of any of Aspects 19 to 35, wherein the method is performed using an apparatus that includes at least one of a head-mounted display (HMD), a mobile handset, or a wireless communication device.

Aspect 37: A non-transitory computer-readable medium having stored thereon instructions that, when executed by one or more processors, cause the one or more processors to: apply a deblocking (DB) filter to a plurality of sub-blocks of a block of the video data to generate a DB-filtered plurality of sub-blocks, the plurality of sub-blocks being less than an entirety of sub-blocks within the block; apply the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and apply a constrained directional enhancement filter (CDEF) to the DB-filtered plurality of sub-blocks and the DB-filtered portion of the additional sub-block to generate a CDEF-filtered plurality of sub-blocks.

Aspect 38: The non-transitory computer-readable medium of Aspect 37, further comprising operations according to any of Aspects 2 to 18, and/or any of Aspects 20 to 36.

Aspect 39: An apparatus for image processing, the apparatus comprising: means for applying a deblocking (DB) filter to a plurality of sub-blocks of a block of video data to generate a DB-filtered plurality of sub-blocks, the plurality of sub-blocks being less than an entirety of sub-blocks within the block; means for applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and means for applying a constrained directional enhancement filter (CDEF) to the DB-filtered plurality of sub-blocks and the DB-filtered portion of the additional sub-block to generate a CDEF-filtered plurality of sub-blocks.

Aspect 40: The apparatus of Aspect 39, further comprising means for performing operations according to any of Aspects 2 to 18, and/or any of Aspects 20 to 36.

What is claimed is:

1. An apparatus for video decoding, the apparatus comprising:
- at least one memory configured to store video data; and
- at least one processor coupled to the at least one memory, the at least one processor configured to:
  - apply a deblocking (DB) filter to a plurality of sub-blocks of a block of the video data to generate a DB-filtered plurality of sub-blocks, the plurality of sub-blocks being less than an entirety of sub-blocks within the block;
  - apply the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and
  - apply a constrained directional enhancement filter (CDEF) to the DB-filtered plurality of sub-blocks and the DB-filtered portion of the additional sub-block to generate a CDEF-filtered plurality of sub-blocks.

2. The apparatus of claim 1, wherein the one or more lines of pixels in the block include at least two lines of pixels in the block that are adjacent to one another.

3. The apparatus of claim 1, wherein the one or more lines of pixels in the block include are each at least six pixels away from an edge of the block.

4. The apparatus of claim 3, wherein the edge of the block is a vertical edge along a side of the block, and wherein the one or more lines of pixels include one or more columns of pixels that are each at least six pixels horizontally away from the vertical edge.

5. The apparatus of claim 4, wherein the side of the block is a right side of the block, and wherein the one or more columns of pixels are each at least six pixels leftward of the vertical edge along the right side of the block.

6. The apparatus of claim 1, wherein the DB filter is applied to the plurality of sub-blocks and at least one of the one or more lines of pixels in the additional sub-block to filter the plurality of sub-blocks to generate the DB-filtered plurality of sub-blocks.

7. The apparatus of claim 1, wherein the additional sub-block and each of the plurality of sub-blocks have a size of 4 pixels by 4 pixels.

8. The apparatus of claim 1, wherein the at least one processor is configured to:
- store a partially-DB-filtered portion of the block in a neighboring block buffer; and
- apply at least one filter to the partially-DB-filtered portion of the block from the neighboring block buffer and to a second block that neighbors the block to filter the second block.

9. The apparatus of claim 8, wherein the partially-DB-filtered portion of the block includes the additional sub-block.

10. The apparatus of claim 8, wherein the partially-DB-filtered portion of the block includes the DB-filtered portion of the additional sub-block.

11. The apparatus of claim 8, wherein a height of the partially-DB-filtered portion of the block is a height of the block, and wherein a width of the partially-DB-filtered portion of the block is less than a width of four sub-blocks.

12. The apparatus of claim 8, wherein a height of the partially-DB-filtered portion of the block is a height of the block, and wherein a width of the partially-DB-filtered portion of the block is at most 10 pixels.

13. The apparatus of claim 1, wherein the at least one processor is configured to:
- upscale the CDEF-filtered plurality of sub-blocks to generate an upscaled-CDEF-filtered plurality of sub-blocks; and
- apply a loop restoration (LR) filter to the upscaled-CDEF-filtered plurality of sub-blocks to generate output block data.

14. The apparatus of claim 13, wherein the at least one processor is configured to:
- output the output block data for storage in the at least one memory.

15. The apparatus of claim 13, further comprising:
- a display configured to display the output block data according to the video data.

16. The apparatus of claim 13, further comprising:
- a communication interface configured to transmit the output block data to a recipient device.

17. The apparatus of claim 1, further comprising:
- a video encoder configured to encode the video data, wherein the at least one processor is configured to receive the video data from the video encoder before applying the DB filter to the plurality of sub-blocks of the block.

18. The apparatus of claim 1, wherein the apparatus includes at least one of a head-mounted display (HMD), a mobile handset, or a wireless communication device.

19. A method for video decoding, the method comprising:
- applying a deblocking (DB) filter to a plurality of sub-blocks of a block of video data to generate a DB-filtered plurality of sub-blocks, the plurality of sub-blocks being less than an entirety of sub-blocks within the block;
- applying the DB filter to one or more lines of pixels in an additional sub-block of the block to generate a DB-filtered portion of the additional sub-block, wherein the one or more lines of pixels in the additional sub-block are filtered without filtering an entirety of the additional sub-block using the DB filter, and wherein the additional sub-block is adjacent to at least one of the plurality of sub-blocks; and
- applying a constrained directional enhancement filter (CDEF) to the DB-filtered plurality of sub-blocks and the DB-filtered portion of the additional sub-block to generate a CDEF-filtered plurality of sub-blocks.

20. The method of claim 19, wherein the one or more lines of pixels in the block include at least two lines of pixels in the block that are adjacent to one another.

21. The method of claim 19, wherein the one or more lines of pixels in the block include are each at least six pixels away from an edge of the block.

22. The method of claim 21, wherein the edge of the block is a vertical edge along a side of the block, and wherein the one or more lines of pixels include one or more columns of pixels that are each at least six pixels horizontally away from the vertical edge.

23. The method of claim 22, wherein the side of the block is a right side of the block, and wherein the one or more columns of pixels are each at least six pixels leftward of the vertical edge along the right side of the block.

24. The method of claim 19, wherein the DB filter is applied to the plurality of sub-blocks and at least one of the one or more lines of pixels in the additional sub-block to filter the plurality of sub-blocks to generate the DB-filtered plurality of sub-blocks.

25. The method of claim 19, further comprising:

storing a partially-DB-filtered portion of the block in a neighboring block buffer; and applying at least one filter to the partially-DB-filtered portion of the block from the neighboring block buffer and to a second block that neighbors the block to filter the second block.

26. The method of claim 25, wherein the partially-DB-filtered portion of the block includes the DB-filtered portion of the additional sub-block.

27. The method of claim 25, wherein a height of the partially-DB-filtered portion of the block is a height of the block, and wherein a width of the partially-DB-filtered portion of the block is less than a width of four sub-blocks.

28. The method of claim 25, wherein a height of the partially-DB-filtered portion of the block is a height of the block, and wherein a width of the partially-DB-filtered portion of the block is at most 10 pixels.

29. The method of claim 19, further comprising:

upscaling the CDEF-filtered plurality of sub-blocks to generate an upscaled-CDEF-filtered plurality of sub-blocks; and applying a loop restoration (LR) filter to the upscaled-CDEF-filtered plurality of sub-blocks to generate output block data.

30. The method of claim 29, further comprising:

outputting the output block data for storage in at least one memory.

* * * * *